(12) United States Patent
Nishi

(10) Patent No.: US 11,566,401 B2
(45) Date of Patent: Jan. 31, 2023

(54) SHOVEL AND ASSIST DEVICE TO WORK TOGETHER WITH SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 441 days.

(21) Appl. No.: 16/783,336

(22) Filed: Feb. 6, 2020

(65) Prior Publication Data

US 2020/0173149 A1 Jun. 4, 2020

Related U.S. Application Data

(63) Continuation of application No. PCT/JP2018/030107, filed on Aug. 10, 2018.

(30) Foreign Application Priority Data

Aug. 14, 2017 (JP) .............................. JP2017-156652

(51) Int. Cl.
*E02F 9/26* (2006.01)
*B60K 35/00* (2006.01)
*E02F 3/32* (2006.01)
*E02F 9/16* (2006.01)
*G06F 3/16* (2006.01)
*G10L 15/22* (2006.01)

(52) U.S. Cl.
CPC ............. *E02F 9/265* (2013.01); *B60K 35/00* (2013.01); *E02F 3/32* (2013.01); *E02F 9/166* (2013.01); *G06F 3/167* (2013.01); *G10L 15/22* (2013.01); *B60K 2370/148* (2019.05); *B60K 2370/52* (2019.05); *G10L 2015/223* (2013.01)

(58) Field of Classification Search
CPC ............. E02F 9/265; E02F 3/32; E02F 9/166; B60K 35/00; B60K 2370/148; B60K 2370/52; G06F 3/167; G10L 15/22; G10L 2015/223
USPC ........................................................ 701/50
See application file for complete search history.

(56) References Cited

U.S. PATENT DOCUMENTS 5,854,988 A    12/1998   Davidson et al.
9,500,490 B1 * 11/2016   Scott .................. B60K 37/02
(Continued)

FOREIGN PATENT DOCUMENTS

EP    1491486    12/2004
EP    3111738     1/2017
(Continued)

OTHER PUBLICATIONS

International Search Report for PCT/JP2018/030107 dated Oct. 23, 2018.

*Primary Examiner* — William D Titcomb
(74) *Attorney, Agent, or Firm* — IPUSA, PLLC

(57) ABSTRACT

A shovel includes a lower traveling body, an upper turning body turnably mounted on the lower traveling body, a cab mounted on the upper turning body, a display device provided in the cab and configured to display a setting screen associated with work assistance, an audio input device provided in the cab, and a hardware processor configured to perform audio recognition. The hardware processor is configured to recognize speech input through the audio input device and executes a process related to the setting screen according to a recognition result.

13 Claims, 20 Drawing Sheets

(56) References Cited

U.S. PATENT DOCUMENTS

| | | |
|---|---|---|
| 2002/0082842 A1 | 6/2002 | Viaud |
| 2002/0150267 A1 | 10/2002 | Furuta |
| 2002/0152079 A1 | 10/2002 | Furuta |
| 2007/0050191 A1* | 3/2007 | Weider ............ G10L 15/22 704/E15.04 |
| 2013/0167227 A1* | 6/2013 | Miura ............. A01B 77/00 726/19 |
| 2013/0261903 A1* | 10/2013 | Hargrave, Jr. ........ E02F 9/262 701/50 |
| 2013/0345939 A1* | 12/2013 | Magaki ............ E02F 9/2214 701/50 |
| 2015/0114731 A1* | 4/2015 | Tsukamoto .......... E02F 9/16 180/53.8 |
| 2017/0028919 A1 | 2/2017 | Izumikawa et al. |
| 2017/0233984 A1* | 8/2017 | Humphrey ......... E02F 9/265 701/50 |
| 2017/0275854 A1 | 9/2017 | Izumikawa |
| 2018/0094408 A1* | 4/2018 | Shintani ............ E02F 9/26 |

FOREIGN PATENT DOCUMENTS

| | | |
|---|---|---|
| JP | 2002-021121 | 1/2002 |
| JP | 2002-023791 | 1/2002 |
| JP | 2002-030696 | 1/2002 |
| JP | 2002-049403 | 2/2002 |
| JP | 2004-027830 | 1/2004 |
| JP | 2005-004032 | 1/2005 |
| JP | 3676204 | 7/2005 |
| JP | 2006-018780 | 1/2006 |
| JP | 6084613 | 2/2017 |
| WO | 2012/165657 | 12/2012 |
| WO | 2014/013910 | 1/2014 |
| WO | 2015/163381 | 10/2015 |
| WO | 2016/098741 | 6/2016 |

* cited by examiner

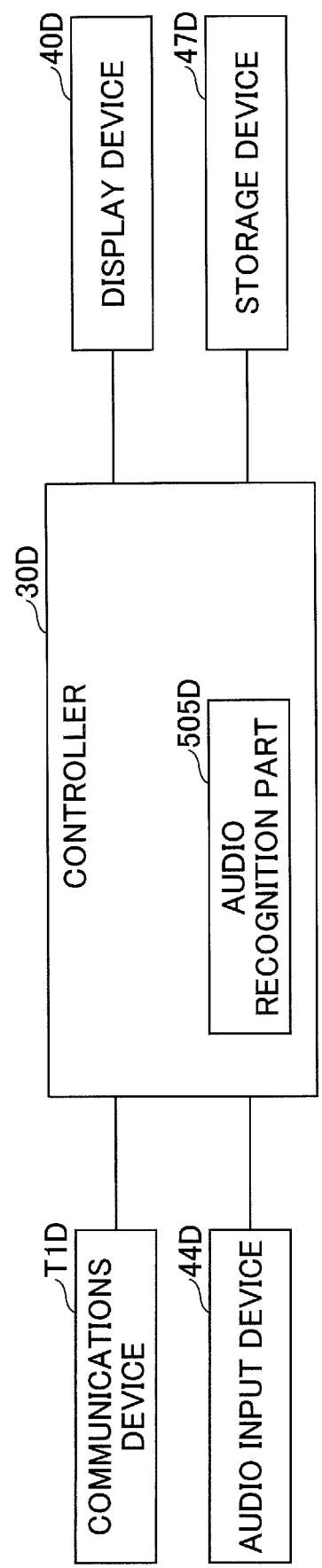

AUDIO RECOGNITION
FUNCTION IS OFF

AUDIO RECOGNITION
FUNCTION IS ON

SHOVEL AND ASSIST DEVICE TO WORK TOGETHER WITH SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/030107, filed on Aug. 10, 2018 and designating the U.S., which claims priority to Japanese patent application No. 2017-156652, filed on Aug. 14, 2017. The entire contents of the foregoing applications are incorporated herein by reference.

BACKGROUND

Technical Field

The present disclosure relates to shovels and assist devices to work together with shovels.

Description of Related Art

An operator who operates a shovel is required to have expert operational skills to efficiently and accurately perform work such as excavation with an attachment. That being so, a system that provides guidance on shovel operations (hereinafter, "machine guidance system") to enable less experienced shovel operators to accurately perform work is known.

To make effective use of the machine guidance system, various settings such as an input of a target surface have to be provided beforehand. Normally, these settings are provided through a setting screen displayed on a display device installed in the cab of the shovel. The setting screen is displayed by, for example, depressing a hardware switch provided near the display device.

SUMMARY

According to an aspect of the present invention, a shovel includes a lower traveling body, an upper turning body turnably mounted on the lower traveling body, a cab mounted on the upper turning body, a display device provided in the cab and configured to display a setting screen associated with work assistance, an audio input device provided in the cab, and a hardware processor configured to perform audio recognition. The hardware processor is configured to recognize speech input through the audio input device and executes a process related to the setting screen according to a recognition result.

BRIEF DESCRIPTION OF THE DRAWINGS

FIG. 3B is a diagram illustrating an example configuration of a controller installed in an assist device;

DETAILED DESCRIPTION

Figure 1:
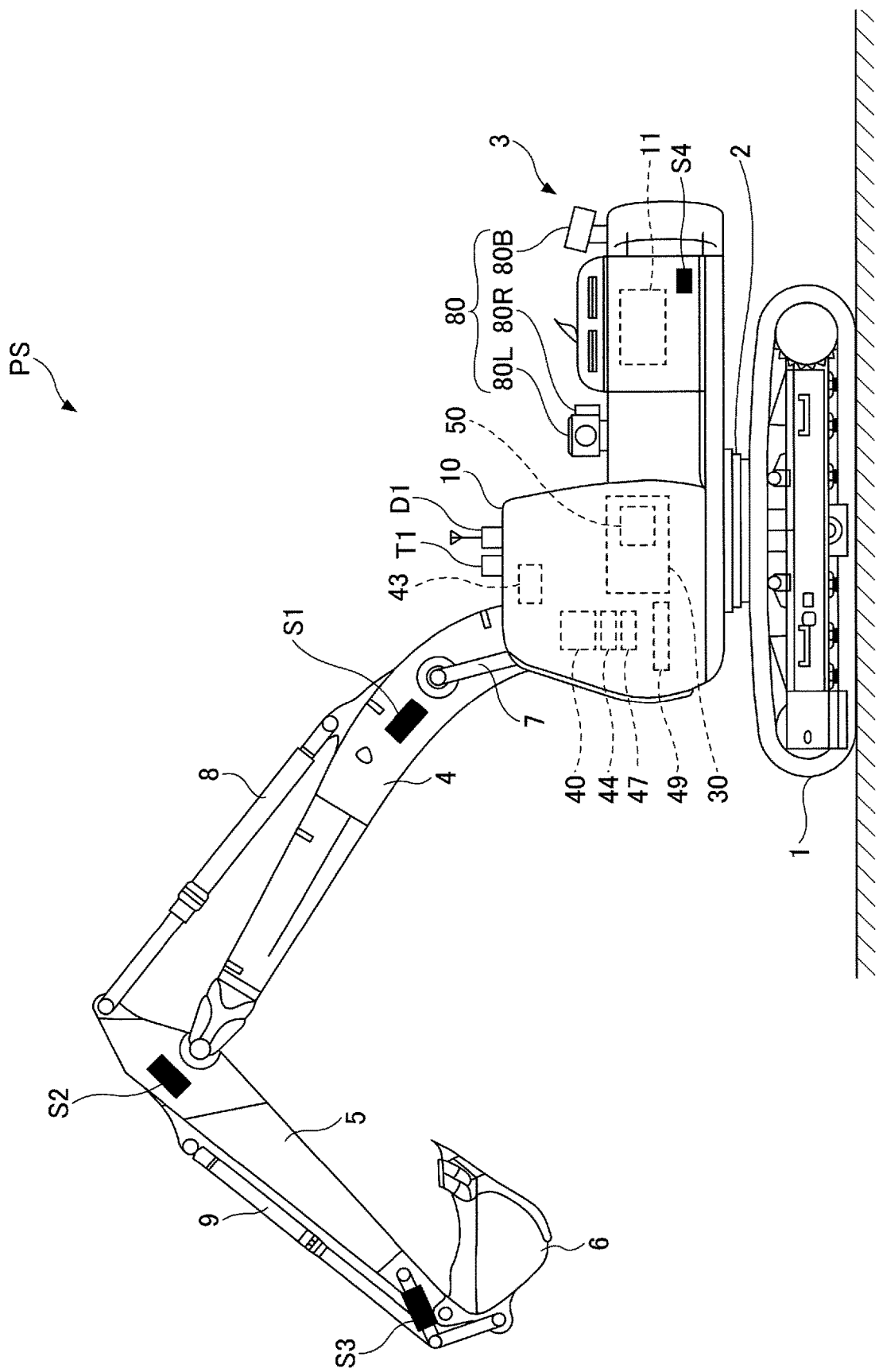
FIG. 1 is a side view of a shovel according to an embodiment of the present invention.

According to the above-described configuration, however, in order to display the setting screen, the shovel operator has to extend her/his arm to the display device to press the hardware switch. In particular, a setting screen associated with work assistance using information and communications technology (ICT), such as work assistance by the machine guidance system (hereinafter, "ICT setting screen"), may frequently be used. Therefore, the operator may find it troublesome to press the hardware switch to display the setting screen.

Therefore, it is desirable to provide a shovel that enables the operator to more easily operate the ICT setting screen.

According to an aspect of the present invention, a shovel that enables the operator to more easily operate the ICT setting screen is provided.

A shovel according to an embodiment of the present invention is described with reference to the drawings. In the drawings, the same components are referred to using the same reference numeral, and duplicate description thereof may be omitted.

FIG. 1 is a side view illustrating an example of a shovel PS according to the embodiment of the present invention. An upper turning body 3 is turnably mounted on a lower traveling body 1 of the shovel PS via a turning mechanism 2. A boom 4 is attached to the upper turning body 3. An arm 5 is attached to the end of the boom 4. A bucket 6 is attached to the end of the arm 5 as an end attachment (working part).

The boom 4, the arm 5, and the bucket 6 constitute an excavation attachment as an example of an attachment. The boom 4 is driven by a boom cylinder 7. The arm 5 is driven by an arm cylinder 8. The bucket 6 is driven by a bucket cylinder 9. A boom angle sensor S1 is attached to the boom 4. An arm angle sensor S2 is attached to the arm 5. A bucket angle sensor S3 is attached to the bucket 6. The boom angle sensor S1, the arm angle sensor S2, and the bucket angle sensor S3 may be collectively referred to as "posture sensor." The posture sensor detects the posture of the attachment. This is for, for example, making it possible to derive the position of the working part of the attachment.

The boom angle sensor S1 detects a boom angle that is the rotation angle of the boom 4. For example, the boom angle sensor S1 is an acceleration sensor that detects the rotation angle of the boom 4 relative to the upper turning body 3 by detecting an inclination to a horizontal plane.

The arm angle sensor S2 detects an arm angle that is the rotation angle of the arm 5. For example, the arm angle sensor S2 is an acceleration sensor that detects the rotation angle of the arm 5 relative to the boom 4 by detecting an inclination to a horizontal plane.

The bucket angle sensor S3 detects a bucket angle that is the rotation angle of the bucket 6. For example, the bucket angle sensor S3 is an acceleration sensor that detects the rotation angle of the bucket 6 relative to the arm 5 by detecting an inclination to a horizontal plane.

The boom angle sensor S1, the arm angle sensor S2, and the bucket angle sensor S3 may alternatively be potentiometers using a variable resistor, stroke sensors that detect the stroke amount of a corresponding hydraulic cylinder, rotary encoders that detect a rotation angle about a link, or the like. At least one of the boom angle sensor S1, the arm angle sensor S2, and the bucket angle sensor S3 may be a combination of an acceleration sensor and a gyro sensor.

A power source such as an engine 11, a body tilt sensor S4, etc., are mounted on the upper turning body 3. The body tilt sensor S4 detects the tilt angle of the upper turning body 3. For example, the body tilt sensor S4 is an acceleration sensor that detects the tilt angle of the upper turning body 3 by detecting an inclination to a horizontal plane.

An image capturing device 80 is provided on the upper turning body 3. The image capturing device 80 includes a left camera 80L that captures an image of a space to the left of the shovel PS, a right camera 80R that captures an image of a space to the right of the shovel PS, and a back camera 80B that captures an image of a space behind the shovel PS. Each of the left camera 80L, the right camera 80R, and the back camera 80B is, for example, a digital camera that contains an imaging device such as a CCD or CMOS, and transmits a captured image to a display device 40 provided in a cab 10.

The cab 10 is provided on the upper turning body 3. A controller 30, the display device 40, an audio output device 43, a storage device 47, etc., are provided in the cab 10. Furthermore, a GPS device (GNSS receiver) D1 and a transmitter T1 are attached to the cab 10. The GPS device D1 detects the position of the shovel PS, and feeds data on the detected position to the controller 30. The transmitter T1 controls communications with the outside, and feeds data obtained from the outside to the controller 30. The transmitter T1 is so configured as to be able to obtain information from the outside via at least one of, for example, a satellite communications network, a cellular phone network, a wireless LAN, etc.

The controller 30 is a control device that operates as a main control part to control the driving of the shovel PS. According to this embodiment, the controller 30 is composed of a processing unit including a CPU and an internal memory. The CPU executes a program stored in the internal memory to implement various functions of the controller 30.

The controller 30 also operates as a machine guidance device 50 that is a control device to provide guidance on operations of the shovel PS. For example, in the case of executing a machine guidance function as work assistance, the machine guidance device 50 visually or aurally notifies an operator of work information that represents the relative relationship between the working part of the attachment and a target surface that is the surface of a target terrain set by the operator, such as the distance between the target surface and the working part of the attachment. The distance between the target surface and the working part of the attachment is, for example, the distance between the target surface and the leading edge (a tooth tip) of the bucket 6 as an end attachment, the back surface of the bucket 6, the end of a breaker as an end attachment, or the like. The machine guidance device 50 notifies the operator of work information through at least one of the display device 40, the audio output device 43, etc., to provide guidance on operations of the shovel PS. The machine guidance device 50 may execute a machine control function to cause the shovel PS to operate automatically or semi-automatically. For example, in the case of executing the machine control function as work assistance, the machine guidance device 50 assists the operator in moving at least one of the boom 4, the arm 5, and the bucket 6 such that the leading edge position of the bucket 6 coincides with the target surface during an excavating operation. More specifically, for example, during an arm closing operation by the operator, the machine guidance device 50 automatically extends or retracts at least one of the boom cylinder 7 and the bucket cylinder 9 to make the leading edge position of the bucket 6 coincide with the target surface. In this case, only by operating a single operating lever, the operator can simultaneously move the boom 4, the arm 5, and the bucket 6 to perform excavation work while making the leading edge position of the bucket 6 coincide with the target work surface.

While the machine guidance device 50 is incorporated into the controller 30 according to the illustration of FIG. 1, the machine guidance device 50 may alternatively be provided outside the controller 30. In this case, the machine guidance device 50 is composed of a processing unit including a CPU and an internal memory the same as the controller 30. The CPU executes a program stored in the internal memory to implement various functions of the machine guidance device 50.

The display device 40 displays an image including various kinds of work information in response to a command from the controller 30 or the machine guidance device 50. The display device 40 is, for example, a liquid crystal display connected to the machine guidance device 50.

The audio output device 43 outputs various kinds of audio information in response to an audio output command from the machine guidance device 50. The audio output device 43 includes, for example, a loudspeaker connected to the machine guidance device 50. The audio output device 43 may be an alarm such as a buzzer.

The storage device 47 is a device for storing various kinds of information. According to the illustration of FIG. 1, a non-volatile storage medium such as a semiconductor memory is employed as the storage device 47.

A gate lock lever 49, which is a mechanism to prevent the shovel PS from being accidentally operated, is provided between the door and the operator seat of the cab 10. The gate lock lever 49 enables various operating apparatuses when pulled up to prevent the operator from getting out of the cab 10, and disables various operating apparatuses when pushed down to allow the operator to get out of the cab 10.

Figure 2A:
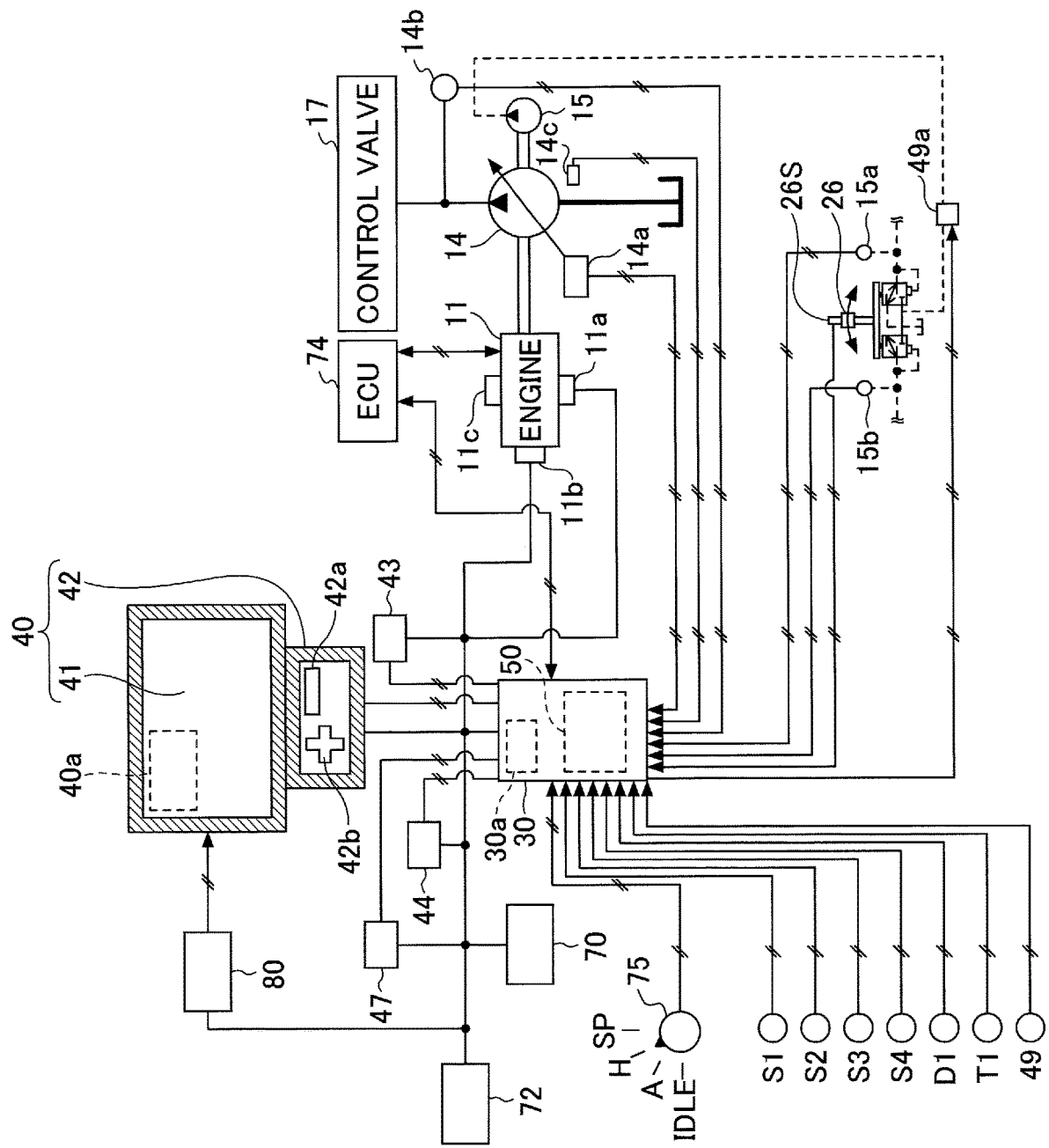
FIG. 2A is a diagram illustrating an example configuration of a basic system installed in the shovel of FIG. 1.
Figure 2B:
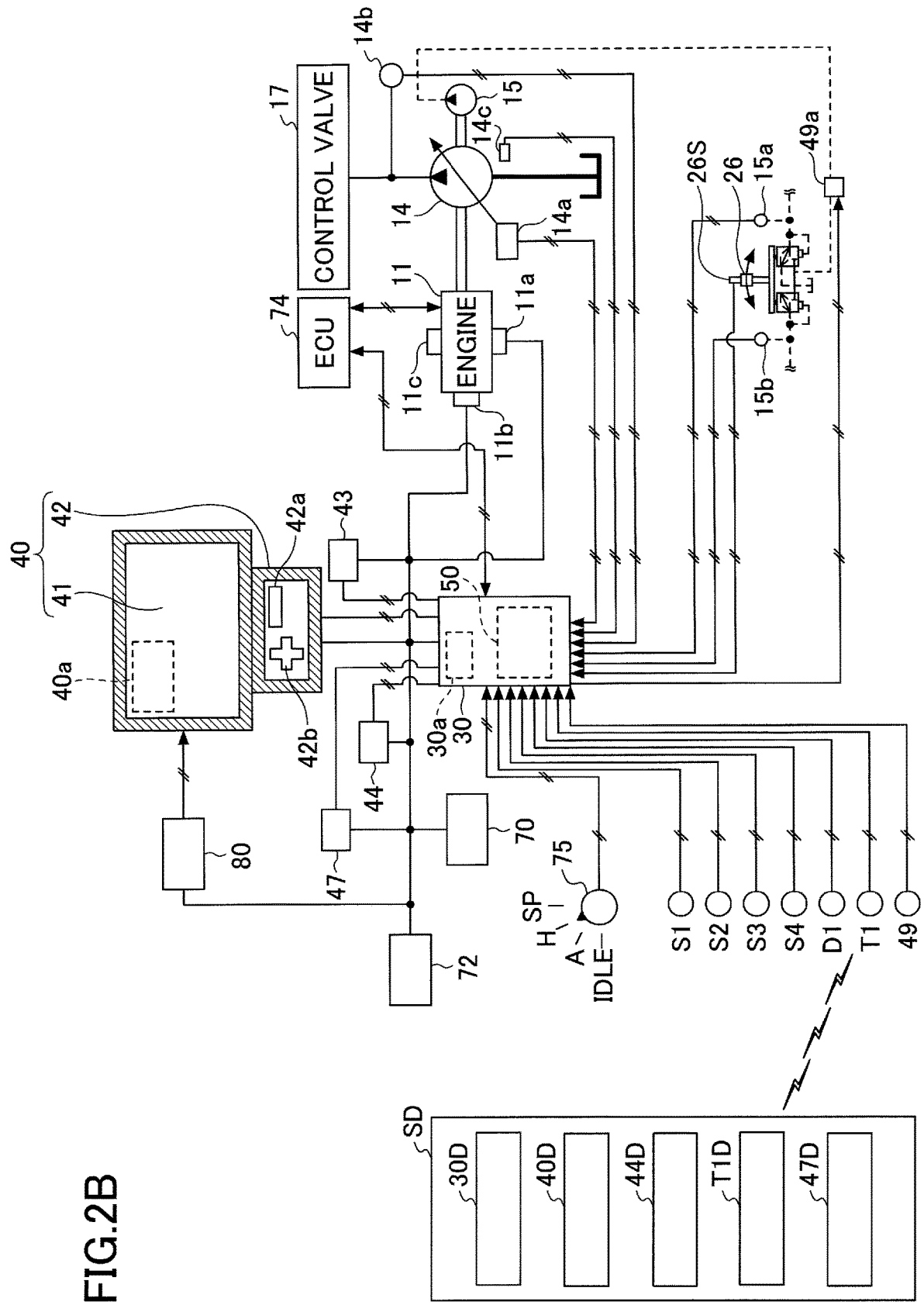
FIG. 2B is a diagram illustrating another example configuration of the basic system installed in the shovel of FIG. 1.

FIGS. 2A and 2B are diagrams illustrating example configurations of a basic system installed in the shovel PS. The configuration of FIG. 2B is different from the configuration of FIG. 2A in that an assist device SD that is a portable terminal such as a smartphone carried by the operator works together with the shovel PS. The display device 40 displays an image including work information fed from the machine guidance device 50. For example, the display device 40 is connected to the controller 30 including the machine guidance device 50 via a cable constituting a communications network such as a CAN or a LIN, a dedicated line, or the like.

The display device 40 includes a conversion part 40a that generates an image to be displayed on an image display part 41. The conversion part 40a generates an image including a live image to be displayed on the image display part 41, based on image data obtained from the image capturing device 80. Image data are input to the display device 40 from each of the left camera 80L, the right camera 80R, and the back camera 80B.

For example, the conversion part 40a converts, into an image signal, data to be displayed on the image display part 41 among various kinds of data input to the display device 40 from the controller 30. Examples of data input to the display device 40 from the controller 30 include at least one of data indicating the temperature of engine coolant water, data indicating the temperature of hydraulic oil, data indicating the remaining amount of an aqueous urea solution, data indicating the remaining amount of fuel, etc.

The conversion part 40a outputs the image signal obtained by the conversion to the image display part 41 to display an image generated based on the live image and at least one of the various kinds of data on the image display part 41. The conversion part 40a may be provided not in the display device 40 but in the controller 30, for example. In this case, the image capturing device 80 is connected to the controller 30.

The display device 40 may include an input device 42. The input device 42 is a device for the operator of the shovel PS to input various kinds of information to the machine guidance device 50 or the controller 30. According to the illustrations of FIGS. 2A and 2B, the input device 42 is push-button switches provided on a switch panel. The input device 42 may be, for example, membrane switches or a touchscreen. Specifically, the input device 42 includes a display switch button 42a and a directional button 42b.

The display switch button 42a is a button for switching screens displayed on the image display part 41. Every time the display switch button 42a is pressed, the display switch button 42a changes the screen displayed on the image display part 41. Screens displayed on the image display part 41 include a main screen and an information display and setting screen.

The directional button 42b is an example of an operation part for inputting directions. According to the illustrations of FIGS. 2A and 2B, a directional pad configured to allow the four directions of an upward, a downward, a rightward, and a leftward direction to be input is adopted as the directional button 42b. The directional button 42b may be a combination of the four independent buttons of a top button, a bottom button, a right button, and a left button. By operating the directional button 42b, the operator can switch screens, move a cursor displayed on the screen, and change the numerical value of an item selected by moving the cursor.

An audio input device 44 is a device for the operator of the shovel PS to input various kinds of audio information to the controller 30 including the machine guidance device 50. According to the illustrations of FIGS. 2A and 2B, the audio input device 44 is a microphone attached inside the cab 10. The audio input device 44 may also be a microphone provided on the upper turning body 3 to be oriented toward the outside of the shovel PS to be able to pick up sounds produced around the shovel PS.

As illustrated in FIG. 2B, the controller 30 may be so configured as to be able to use audio input through an audio input device 44D installed in the assist device SD carried by the operator. The assist device SD of FIG. 2B is, for example, a portable terminal such as a smartphone, a tablet PC, a voice recorder, or the like, and includes a controller 30D, a display device 40D, the audio input device 44D, a transmitter T1D, and a storage device 47D. The controller 30D, the display device 40D, the audio input device 44D, the transmitter T1D, and the storage device 47D operate in the same manner as the controller 30, the display device 40, the audio input device 44, the transmitter T1, and the storage device 47, respectively, installed in the shovel PS.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72, etc., of the shovel PS besides the controller 30 and the display device 40. Furthermore, a starter lib of the engine 11 is driven with electric power from the rechargeable battery 70 to start the engine 11.

The engine 11 is controlled by an engine controller (ECU) 74. The rotating shaft of the engine 11 is connected to the rotating shaft of each of a main pump 14 and a pilot pump 15. The ECU 74 transmits various data indicating the condition of the engine 11 (for example, data indicating coolant water temperature detected with a water temperature sensor 11c) to the controller 30. The controller 30 stores these data in a storage part 30a and transmits the data to the display device 40 on an as-needed basis.

The main pump 14 is a hydraulic pump for supplying hydraulic oil to a control valve 17 via a hydraulic oil line. The main pump 14 is, for example, a swash plate variable displacement hydraulic pump.

The pilot pump 15 is a hydraulic pump for supplying hydraulic oil to various hydraulic control apparatus via a pilot line. The pilot pump 15 is, for example, a fixed displacement hydraulic pump. The pilot pump 15 may be omitted. In this case, the functions implemented by the pilot pump 15 may be implemented by the main pump 14.

The control valve 17 is a hydraulic controller that controls a hydraulic system in the shovel PS. The control valve 17 selectively supplies hydraulic oil discharged by the main pump 14 to, for example, one or more hydraulic actuators. Examples of hydraulic actuators include the boom cylinder 7, the arm cylinder 8, the bucket cylinder 9, traveling hydraulic motors, and a turning hydraulic motor.

An operating apparatus 26 is an apparatus that the operator uses to operate hydraulic actuators, and is provided in the cab 10. When the operating apparatus 26 is operated, hydraulic oil is supplied from the pilot pump 15 to a pilot port of a corresponding flow control valve. The pilot port is supplied with hydraulic oil of a pressure commensurate with the operation details of the operating apparatus 26. The operation details include, for example, the direction of operation and the amount of operation.

The controller 30 controls the operation of the entire shovel PS. The controller 30 closes a gate lock valve 49a when the gate lock lever 49 is pushed down and opens the gate lock valve 49a when the gate lock lever 49 is pulled up. The gate lock valve 49a is a selector valve provided in an oil passage between the control valve 17 and the operating apparatus 26. The gate lock valve 49a opens or closes in response to a command from the controller 30. Alternatively, the gate lock valve 49a may be mechanically connected to the gate lock lever 49 to open or close in accordance with the movement of the gate lock lever 49.

The gate lock valve 49a is closed to interrupt the flow of hydraulic oil between the control valve 17 and the operating apparatus 26 to disable the operating apparatus 26. The gate lock valve 49a is opened to allow passage of hydraulic oil between the control valve 17 and the operating apparatus 26 to enable the operating apparatus 26.

The controller 30 detects the operation details of the operating apparatus 26 from a pilot pressure detected by a pressure sensor 15a or 15b with the gate lock valve 49a being opened to have the operating apparatus 26 enabled.

Furthermore, the controller 30 obtains various kinds of data as described below, for example. The data obtained by the controller 30 are stored in the storage part 30a.

A regulator 14a of the main pump 14 outputs data indicating a swash plate angle to the controller 30. A discharge pressure sensor 14b outputs data indicating the discharge pressure of the main pump 14 to the controller 30. An oil temperature sensor 14c provided in a conduit between a hydraulic oil tank and the main pump 14 outputs data indicating the temperature of hydraulic oil flowing through the conduit to the controller 30. The pressure sensors 15a and 15b detect a pilot pressure generated when the operating apparatus 26 is operated, and transmit data indicating the detected pilot pressure to the controller 30.

A switch button 26S as another example of the input device 42 is provided on an operating lever serving as the operating apparatus 26. The operator can output a command signal to the controller 30 by operating the switch button 26S while operating the operating lever.

An engine rotational speed adjustment dial 75 is provided in the cab 10 of the shovel PS. The engine rotational speed adjustment dial 75 is a dial for adjusting the rotational speed of the engine 11. For example, the operator can switch the engine rotational speed in a stepwise manner by turning the engine rotational speed adjustment dial 75. According to this embodiment, the engine rotational speed adjustment dial 75 is provided so that the operator can switch the engine rotational speed among the four levels of SP mode, H mode, A mode, and idling mode. The engine rotational speed adjustment dial 75 transmits data indicating the setting of the engine rotational speed to the controller 30. FIGS. 2A and 2B illustrate a state where the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to balance workload and fuel efficiency, and uses the second highest engine rotational speed. The A mode is an rotational speed mode selected when it is desired to operate the shovel at low noise while prioritizing fuel efficiency, and uses the third highest engine rotational speed. The idling mode is a rotational speed mode selected when idling the engine, and uses the lowest engine rotational speed. The engine 11 is controlled to a constant rotational speed at the engine rotational speed of the rotational speed mode set by the engine rotational speed adjustment dial 75.

Figure 3A:
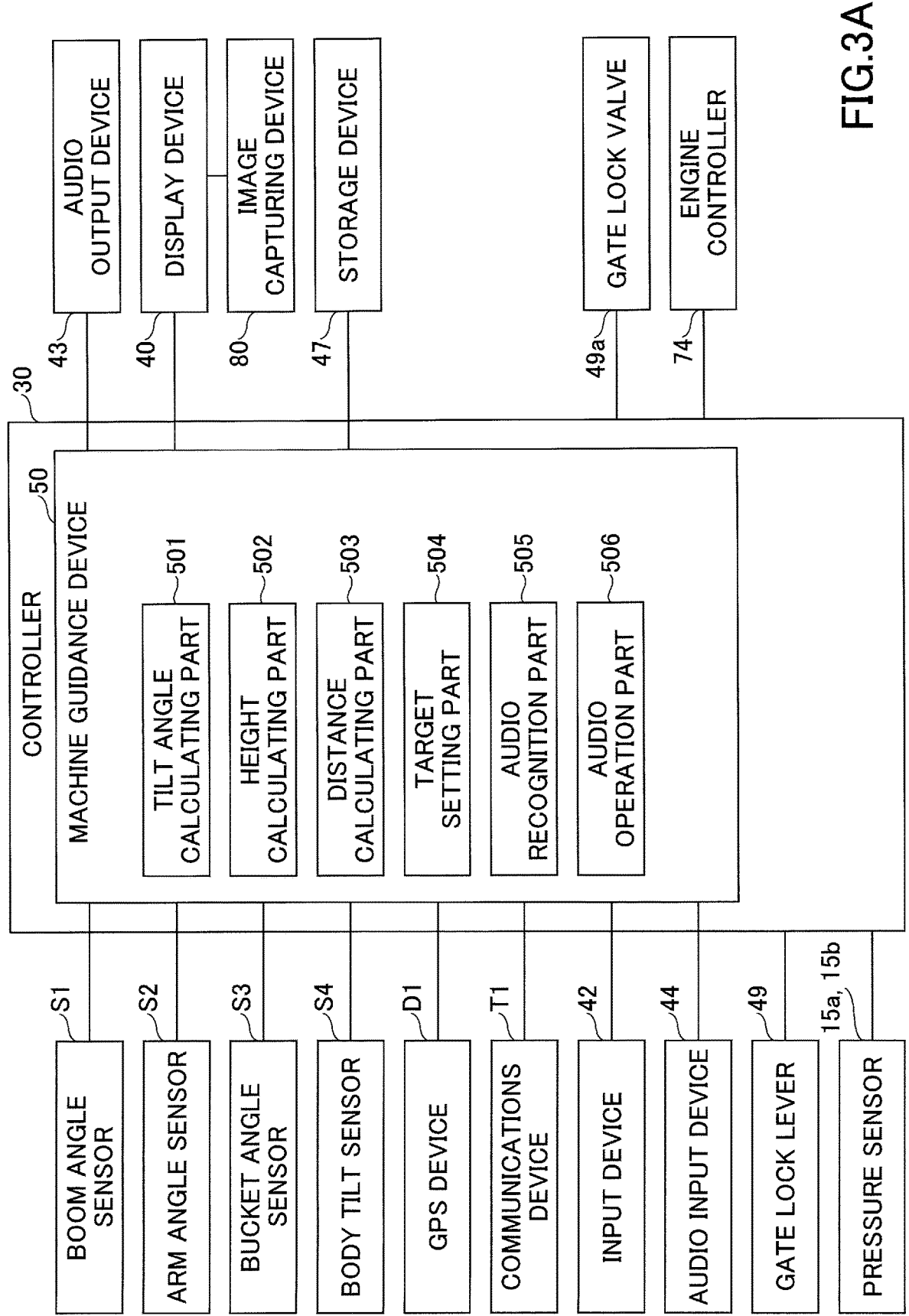
FIG. 3A is a diagram illustrating an example configuration of a controller installed in the shovel.

Next, various functions provided in the machine guidance device 50 are described with reference to FIG. 3A. FIG. 3A is a diagram illustrating an example configuration of the controller 30 installed in the shovel PS.

In addition to controlling the operation of the entire shovel PS, the controller 30 controls whether to provide guidance by the machine guidance device 50. Specifically, in response to determining that the shovel is not working, the controller 30 transmits a guidance stop command to the machine guidance device 50 to stop guidance by the machine guidance device 50.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

The machine guidance device 50 receives the output information of at least one of the boom angle sensor S1, the arm angle sensor S2, the bucket angle sensor S3, the body tilt sensor S4, the GPS device D1, the transmitter T1, the input device 42, the audio input device 44, etc. The machine guidance device 50 then executes various operations based on the received information and information stored in the storage device 47 and outputs the operation results to at least one of the audio output device 43, the display device 40, etc.

For example, the machine guidance device 50 calculates the height of the working part of the attachment and outputs a control command commensurate with the size of the distance between the height of the working part and a predetermined target height to at least one of the audio output device 43 and the display device 40. In response to receiving the control command, the audio output device 43 outputs a sound that represents the size of the distance. In response to receiving the control command, the display device 40 displays an image that represents the size of the distance. The target height is a concept including a target depth, and is a height that the operator inputs as a vertical distance relative to a reference point after causing the working part to contact the reference point, for example. The reference point typically has a known latitude, longitude, and altitude. Hereinafter, information on the size of the distance between the height of the working part of the attachment and the target height displayed on the display device 40 is referred to as "working part guidance information." The operator can proceed with work while checking the transition of the size of the distance by looking at the working part guidance information.

To perform the above-described guidance, the machine guidance device 50 includes a tilt angle calculating part 501, a height calculating part 502, a distance calculating part 503, a target setting part 504, an audio recognition part 505, and an audio operation part 506.

The tilt angle calculating part 501 calculates the tilt angle of the shovel, which is the tilt angle of the upper turning body 3 relative to a horizontal plane, based on a detection signal from the body tilt sensor S4.

The height calculating part 502 calculates the height of the working part of the attachment relative to a reference plane. This calculation is based on the tilt angle calculated by the tilt angle calculating part 501 and on the boom angle, the arm angle, and the bucket angle calculated from the respective detection signals of the boom angle sensor S1, the arm angle sensor S2, and the bucket angle sensor S3. The reference plane is, for example, a virtual plane including a plane in which the shovel PS is positioned. According to the illustration of FIG. 3A, because excavation is performed with the leading edge of the bucket 6, the leading edge (tooth tip) of the bucket 6 corresponds to the working part of the attachment. In the case of performing work such as leveling soil with the back surface of the bucket 6, the back surface of the bucket 6 corresponds to the working part of the attachment.

The distance calculating part 503 calculates the distance between the height of the working part calculated by the height calculating part 502 and a target height. According to the illustration of FIG. 3A, the distance calculating part 503 calculates the distance between the height of the leading edge (tooth tip) of the bucket 6 calculated by the height calculating part 502 and the target height.

The target setting part 504 sets a target value used by the machine guidance function or the machine control function. For example, the target setting part 504 sets the target value based on information on the position of a predetermined portion of the excavation attachment at each of two points of time. For example, based on the position coordinates of the leading edge of the bucket 6 at each of two points of time, the target setting part 504 calculates the angle famed between a virtual straight line passing through these two coordinate points and a horizontal plane, and sets the angle as a target slope angle. Each of the two points of time is a point of time at which a predetermined condition is satisfied, and includes, for example, a point of time at which a predetermined switch is depressed, and a point of time at which a predetermined time has passed with the excavation attachment remaining stationary. The target slope angle may include zero degrees.

The target setting part 504 may display geometric information on the display device 40, using information on the position of a predetermined portion of the excavation attachment at each of two points of time. The geometric information is information on the results of measurement by the shovel PS. For example, based on the position coordinates of the leading edge of the bucket 6 at each of two points of time, the target setting part 504 displays the angle formed between a virtual straight line passing through these two coordinate points and a horizontal plane as geometric information on the display device 40. The two coordinate points may be directly displayed as geometric information, and the horizontal distance and the vertical distance between the two coordinate points may be displayed as geometric information. According to this embodiment, of the two points of time, a first point of time is a point of time at which a predetermined condition is satisfied as described above. Of the two points of time, a second point of time is a current point of time. Thus, the geometric information is displayed in order to have the operator understand the positional relationship between the coordinate point of the predetermined portion recorded at the first point of time and the coordinate point of the predetermined portion at the current point of time.

The audio recognition part 505 recognizes speech spoken by the operator of the shovel PS. According to the illustration of FIG. 3A, the audio recognition part 505 converts speech input through the audio input device 44 into text, using a speech recognition engine. The audio recognition part 505 may display text representing the recognized speech on the display device 40 in order to cause the operator to check whether the speech spoken by the operator matches the speech recognized by the machine guidance device 50. The speech recognition engine uses one or more speech recognition dictionaries to convert input speech into text. The speech recognition dictionaries are stored in, for example, the storage device 47. The speech recognition dictionaries may be provided one for each dialect such as the Kansai dialect, the Tohoku dialect, or the Kyushu dialect. In this case, the audio recognition part 505 may switch the speech recognition dictionary to be used based on the current position of the shovel PS detected based on the output of the GPS device D1, for example. For example, in response to determining that the shovel PS is located in the Tohoku region, the audio recognition part 505 may use a speech recognition dictionary suitable for the Tohoku dialect. Furthermore, the audio recognition part 505 may be configured to identify the dialect used by the operator based on the characteristics (such as an accent and an intonation) of input speech. In this case, the audio recognition part 505 may switch speech recognition dictionaries according to the dialect used by the operator.

The audio recognition part 505 may be configured to identify the operator of the shovel PS. In this case, the audio recognition part 505 may use a voiceprint recognition technique. For example, when a predetermined password is given, the audio recognition part 505 may check obtained voiceprint data with registered voiceprint data to determine whether a person who has given the password is a registered operator.

The audio recognition part 505 may have a learning function. For example, in response to determining that the operator has re-input speech, the audio recognition part 505 may learn to recognize the first input speech as the second input speech from next time. For example, in the case of failing to understand the first input speech with a peculiarity and thereafter succeeding in recognizing the second input speech, the audio recognition part 505 may learn to recognize the first input speech with a peculiarity as the same speech as the second input speech from next time. As a result, the audio recognition part 505 becomes able to recognize speech with a peculiarity that was not recognizable first. Furthermore, for example, when the audio recognition part 505 cannot determine that speech recognized at a first point of time is a predetermined registered command and an operation for starting a process corresponding to the registered command is manually performed, the audio recognition part 505 may determine that the speech recognized at the first point of time has represented the registered command. From next time, in response to recognizing the same speech as the speech recognized at the first point of time, the audio recognition part 505 may consider that the registered command is given and automatically start a process corresponding to the registered command. The registered command is registered speech that serves as a trigger for starting a predetermined process, and includes, for example, registered speech "MAIN DISPLAY" for starting to display a main screen. In this case, a manual operation for starting a process corresponding to the registered command is, for example, the depression of the display switch button 42a.

When identifying the operator using a voiceprint recognition technique or the like, the audio recognition part 505 may learn the characteristics of the operator's voice operator by operator.

The machine guidance device 50 may be configured to be able to use speech input through not the audio input device 44 installed in the cab 10 but the audio input device 44D installed in the assist device SD. In this case, as illustrated in FIG. 3B, the assist device SD may include an audio recognition part 505D. FIG. 3B illustrates an example configuration of the assist device SD that includes the controller 30D including the audio recognition part 505D. According to this configuration, the audio recognition part 505D operates the same as the audio recognition part 505 of the controller 30 provided in the shovel PS. The audio recognition part 505D transmits the result of audio recognition to the controller 30 through the transmitter T1D. The controller 30 receives the result of audio recognition transmitted from the assist device SD through the transmitter T1.

This configuration enables the operator of the shovel PS to input speech through the audio input device 44 installed in the cab 10 when in the cab 10 and to input speech through the audio input device 44D installed in the assist device SD when outside the cab 10. When the audio input device 44D installed in the assist device SD can be used, the audio input device 44 installed in the cab 10 may be omitted. In this case, even when in the cab 10, the operator of the shovel PS can input speech through the audio input device 44D installed in the assist device SD. Furthermore, even in the case of using the audio input device 44D installed in the assist device SD, speech recognition may be performed in the audio recognition part 505. In this case, the audio input device 44D has only to transmit not the result of audio recognition but audio information to the controller 30 through the transmitter T1D.

The audio operation part 506 performs various kinds of operations according to the results of audio recognition. According to the illustration of FIG. 3A, the audio operation part 506 starts when the audio recognition part 505 recognizes predetermined speech for activating the audio operation part 506 (hereinafter, "wake speech"). Furthermore, the audio operation part 506 stops when there is no speech input from the operator for a predetermined period of time. The audio operation part 506 may stop when the audio recognition part 505 recognizes predetermined speech for stopping the audio operation part 506 (hereinafter, "stop speech"). The same applies when the audio recognition part 505D of FIG. 3B recognizes wake speech or stop speech. The wake speech is, for example, "SUMITOMO START." The stop speech is, for example, "SUMITOMO END."

The audio operation part 506 may start the machine control function in response to recognizing predetermined speech for starting the machine control function (hereinafter, "MC speech"). The MC speech is, for example, "MC (em si) ON." This configuration enables the operator of the shovel PS to start the machine control function without operating the switch button 26S provided at the end of an operating lever.

For example, in response to recognizing wake speech, the audio recognition part 505 checks obtained voiceprint data with registered voiceprint data to determine whether a person who has spoken the wake speech is a registered operator. The audio operation part 506 may be configured to start only when the audio recognition part 505 determines that the person is a registered operator. The same applies when the audio recognition part 505D in the assist device SD determines whether a person who has spoken wake speech is a registered operator.

For example, the audio operation part 506 executes a process related to an ICT setting screen in accordance with the result of audio recognition. The process related to an ICT setting screen includes, for example, switching the image displayed on a hierarchical information display area 41n of FIG. 5, selecting a setting item in a main area R2, and inputting the setting value of a setting item.

Figure 4:
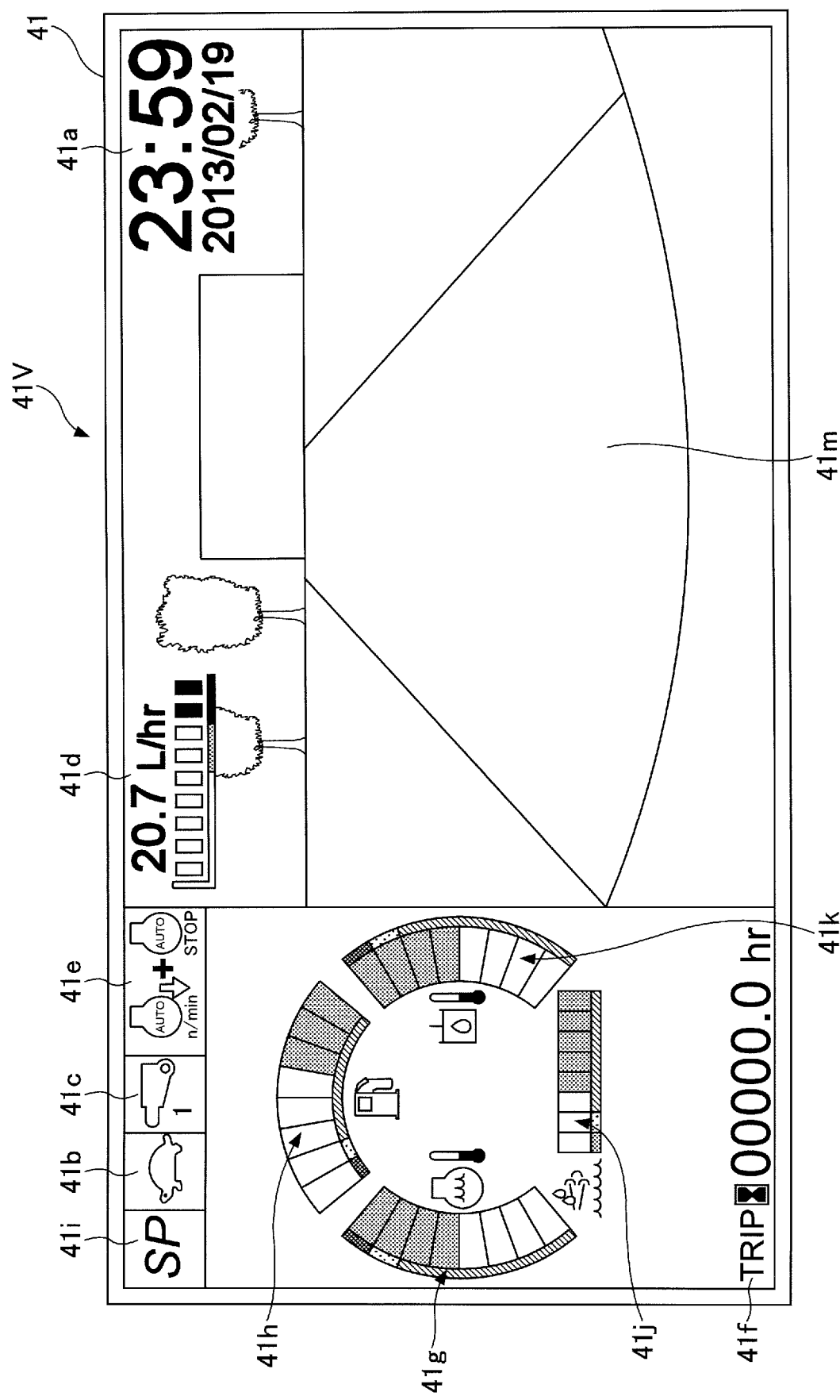
FIG. 4 is a diagram illustrating an example of a main screen.

Next, an example layout of a screen displayed on the display device 40 is described. FIG. 4 is a diagram illustrating an example of a main screen 41V displayed on the image display part 41 of the display device 40.

The main screen 41V includes a date and time display area 41a, a traveling mode display area 41b, an attachment display area 41c, an average fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, and a camera image display area 41m. Each of the traveling mode display area 41b, the attachment display area 41c, the engine control status display area 41e, and the rotational speed mode display area 41i is an example of a settings display part that displays the settings of the shovel PS. Each of the average fuel efficiency display area 41d, the engine operating time display area 41f, the coolant water temperature display area 41g, the remaining fuel amount display area 41h, the remaining aqueous urea solution amount display area 41j, and the hydraulic oil temperature display area 41k is an example of an operating condition display part that displays the operating condition of the shovel.

The date and time display area 41a is an area for displaying a current date and time. The traveling mode display area 41b is an area for displaying an icon that represents a current traveling mode. The attachment display area 41c is an area for displaying an icon that represents a currently attached attachment. The average fuel efficiency display area 41d is an area for displaying current average fuel efficiency. The engine control status display area 41e is an area for displaying an icon that represents the control status of the engine 11. The coolant water temperature display area 41g is an area for displaying the current temperature condition of engine coolant water. The remaining fuel amount display area 41h is an area for displaying the state of the remaining amount of fuel stored in a fuel tank. The rotational speed mode display area 41i is an area for displaying a current rotational speed mode. The remaining aqueous urea solution amount display area 41j is an area for displaying the status of the remaining amount of an aqueous urea solution stored in an aqueous urea solution tank. The hydraulic oil temperature display area 41k is an area for displaying the temperature condition of hydraulic oil in a hydraulic oil tank. The camera image display area 41m is an area for displaying a camera image.

Figure 5:
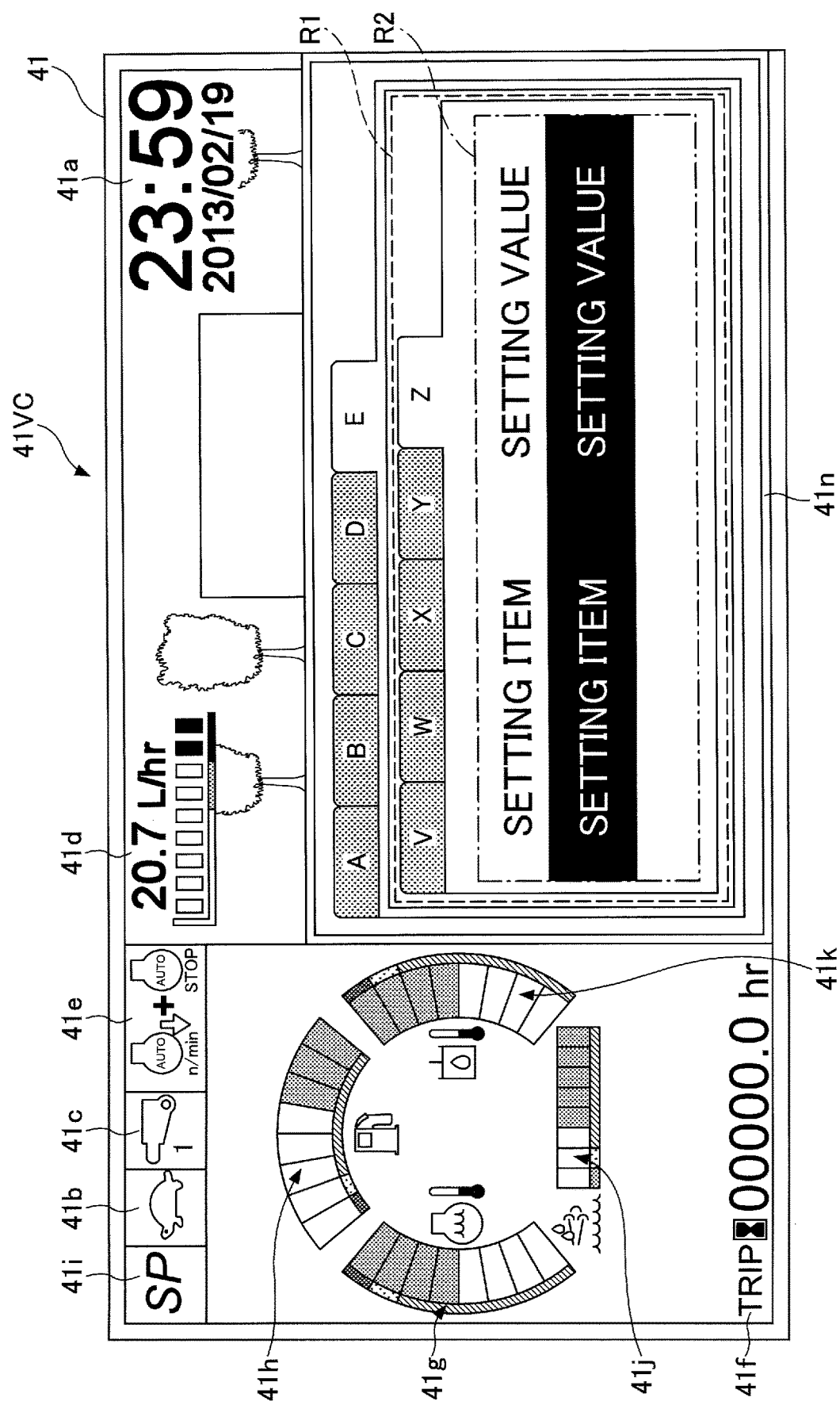
FIG. 5 is a diagram illustrating an example of an information display and setting screen.

Next, an information display and setting screen displayed on the display device 40 is described with reference to FIG. 5. FIG. 5 is a diagram illustrating an example of an information display and setting screen 41VC displayed on the image display part 41 of the display device 40. The information display and setting screen 41VC is different from the main screen 41V of FIG. 4 in including the hierarchical information display area 41n in place of the camera image display area 41m. The information display and setting screen 41VC, however, is otherwise equal to the main screen 41V. Therefore, a description of a common portion is omitted, and differences are described in detail.

The hierarchical information display area 41n is an area for displaying hierarchically structured information. According to the illustration of FIG. 5, the hierarchical information display area 41n displays information having a two-layer hierarchical structure, using five tabs for one layer.

FIG. 5 illustrates how the setting value of a particular setting item is changed in the hierarchical information display area 41n. Specifically, FIG. 5 illustrates how the operator changes the setting value of a setting item in the fifth tab of the second layer, using the display switch button 42a and the directional button 42b.

The operator first presses the display switch button 42a to display the information display and setting screen 41VC on the display device 40. Specifically, the operator presses the display switch button 42a with the main screen 41V being displayed, namely, not the hierarchical information display area 41n but the camera image display area 41m being displayed, to switch the camera image display area 41m to the hierarchical information display area 41n. At this point, a first image (not depicted) in which the first tab "A" is selected and the four second through fifth tabs "B" through "E" of the first layer are not selected is displayed in the hierarchical information display area 41n of the information display and setting screen 41VC.

According to FIG. 5, an image in which the fifth tab "E" of the first layer is selected is displayed in the hierarchical information display area 41n. The area surrounded by a dashed line represents a main area R1 in which various kinds of information are displayed. The dashed line is not actually displayed.

A screen in which the first image is displayed in the hierarchical information display area 41n is, for example, a fuel efficiency information screen. In the main area R1 of the fuel efficiency information screen, for example, the past trends of fuel efficiency (such as the amount of fuel consumption per unit time) or the like is displayed.

When the operator presses the right portion of the directional button 42b with the first image being displayed, the image displayed in the hierarchical information display area 41n is switched to a second image (not depicted). In the second image, for example, the second tab "B" of the first layer is selected. A screen in which the second image is displayed in the hierarchical information display area 41n is, for example, a machine condition information screen. In the main area R1 of the machine condition information screen, for example, the past trends of the engine rotational speed or the like is displayed.

When the operator presses the right portion of the directional button 42b with the second image being displayed, the image displayed in the hierarchical information display area 41n is switched to a third image (not depicted). Furthermore, when the operator presses the right portion of the directional button 42b with the third image being displayed, the image displayed in the hierarchical information display area 41n is switched to a fourth image (not depicted).

In the third image, the third tab "C" of the first layer is selected. In the fourth image, the fourth tab "D" of the first layer is selected. A screen in which the third image is displayed in the hierarchical information display area 41n is, for example, a maintenance information screen, and a screen in which the fourth image is displayed in the hierarchical information display area 41n is, for example, an attachment option information screen.

When the operator presses the right portion of the directional button 42b with the fourth image being displayed, the image displayed in the hierarchical information display area 41n is switched to a fifth image (not depicted). In the fifth image, the fifth tab "E" of the first layer is selected. The fifth image includes the five tabs of the second layer in the main area R1. A screen in which the fifth image is displayed in the hierarchical information display area 41n is, for example, a setting screen associated with work assistance using information and communications technology (ICT) such as the machine guidance device 50 (ICT setting screen). The work assistance includes at least one of, for example, executing the machine guidance function to assist the shovel PS in performing work, executing the machine control function to assist the shovel PS in performing work, and displaying payload-related information to assist the shovel PS in performing work. Executing the machine guidance function to assist the shovel PS in performing work includes, for example, displaying the relative positional relationship between the working part of the attachment and a target surface to assist the shovel PS in performing work. Examples of payload-related information include the maximum load capacity of a dump truck that works together with the shovel PS and the remaining weight of an excavated object that can be loaded into the dump truck. The payload-related ICT setting screen includes the type of a dump truck (dumper ID), such as "4 tons" or "10 tons," and the type of an excavated object (material ID), such as "sand," "clay," or "concrete," as setting items. The type of a dump truck is used to derive, for example, the maximum load capacity of a dump truck, and the type of an excavated object is used to derive, for example, the remaining weight of an excavated object that can be loaded into a dump truck.

When the operator presses the right portion of the directional button 42b with the fifth image being displayed, the image displayed in the hierarchical information display area 41n is switched to the first image. When the operator presses the bottom portion of the directional button 42b with the fifth image being displayed, the image displayed in the hierarchical information display area 41n is switched to a fifth V image (not depicted).

In the fifth V image, the first tab "V" is selected and the four second through fifth tabs "W" through "Z" of the second layer is not selected. The area surrounded by a one-dot chain line represents the main area R2 in which the setting values of various setting items are displayed. The one-dot chain line is not actually displayed. A screen displayed in the hierarchical information display area 41n of the fifth V image is, for example, a target surface setting screen that is one of ICT setting screens. On the target surface setting screen, for example, a target height, a target slope angle, etc., are set.

When the operator presses the right portion of the directional button 42b with the fifth V image being displayed, the image displayed in the hierarchical information display area 41n is switched to a fifth W image (not depicted). In the fifth W image, the second tab "W" of the second layer is selected. In the main area R2, the setting values of setting items are displayed the same as in the case of the fifth V image. A screen in which the fifth W image is displayed in the hierarchical information display area 41n is, for example, a buzzer setting screen that is one of ICT setting screens. On the buzzer setting screen, for example, the frequency (level), volume, etc., of a buzzer sound.

When the operator presses the right portion of the directional button 42b with the fifth W image being displayed, the image displayed in the hierarchical information display area 41n is switched to a fifth X image (not depicted). When the operator presses the right portion of the directional button 42b with the fifth X image being displayed, the image displayed in the hierarchical information display area 41n is switched to a fifth Y image (not depicted). When the operator presses the right portion of the directional button 42b with the fifth Y image being displayed, the image displayed in the hierarchical information display area 41n is switched to a fifth Z image (not depicted). In the fifth X image, the third tab "X" of the second layer is selected. In the fifth Y image, the fourth tab "Y" of the second layer is selected. In the fifth Z image, the fifth tab "Z" of the second layer is selected. In the main area R2 of each of the fifth X image through the fifth Z image, the setting values of setting items are displayed the same as in the case of the fifth V image.

A screen in which the fifth X image is displayed in the hierarchical information display area 41n is, for example, a measurement setting screen that is one of ICT setting screens. On the measurement setting screen, for example, it is determined whether to enable the use of a measurement mode. A screen in which the fifth Y image is displayed in the hierarchical information display area 41n is, for example, a reference point setting screen that is one of ICT setting screens. On the reference point setting screen, for example, it is determined whether to enable the use of a bucket benchmark setting function. The bucket benchmark setting function is a function to set a benchmark (reference point) with respect to the bucket 6. When the bucket benchmark setting function is enabled, by pressing a bucket benchmark setting button (not depicted) that is one of the switch buttons 26S with a tooth tip of the bucket 6 being in contact with a reference point, the operator can register the coordinates of the tooth tip of the bucket 6 at the time as the origin. A screen in which the fifth Z image is displayed in the hierarchical information display area 41*n* is, for example, a turning angle reference setting screen that is one of ICT setting screens. On the turning angle reference setting screen, for example, it is determined whether to enable the use of a turning benchmark setting function. The turning benchmark setting function is a function to set a reference for a turning angle. When the turning benchmark setting function is enabled, by pressing a turning benchmark setting button (not depicted) that is one of the switch buttons 26S with the upper turning body 3 being turned to be oriented in a desired direction, the operator can register a turning angle at the time as zero degrees.

When the operator presses the right portion of the directional button 42*b* with the fifth Z image being displayed, the image displayed in the hierarchical information display area 41*n* is switched to the fifth V image. When the operator presses the bottom portion of the directional button 42*b* with the fifth Z image being displayed, the image displayed in the hierarchical information display area 41*n* is switched to a fifth Z1 image (not depicted).

In the fifth Z1 image, the first setting item is selected and the second setting item is not selected in the main area R2 of the fifth tab "Z" of the second layer.

When the operator presses the bottom portion of the directional button 42*b* with the fifth Z1 image being displayed, the image displayed in the hierarchical information display area 41*n* is switched to a fifth Z2 image. FIG. 5 illustrates that the fifth Z2 image is displayed. In the fifth Z2 image, the second setting item is selected and the first setting item is not selected in the main area R2 of the fifth tab "Z" of the second layer. The selected second setting item may be indicated by a cursor.

When the operator presses the top portion or the bottom portion of the directional button 42*b* with the fifth Z2 image being displayed, the image displayed in the hierarchical information display area 41*n* is switched to the fifth Z1 image. When the operator presses the right portion of the directional button 42*b* with the fifth Z2 image being displayed, the setting value of the second setting time is incremented (increased) by a predetermined increment. When the operator presses the left portion of the directional button 42*b* with the fifth Z2 image being displayed, the setting value of the second setting time is decremented (decreased) by a predetermined decrement.

In the above description, the fifth V image through the fifth Z image are illustrated as examples. The setting items in the images, however, may be either integrated or separated. Furthermore, other setting items may be added to the images.

Following the above-described procedure, the operator can change the setting value of a setting item. Specifically, after pressing the display switch button 42*a* to display the information display and setting screen 41VC, the operator presses the right portion of the directional button 42*b* four times to display the ICT setting screen. The operator may press the left portion of the directional button 42*b* once to display the ICT setting screen. Thereafter, the operator presses the bottom portion of the directional button 42*b* once and further presses the right portion of the directional button 42*b* four times to display the turning angle reference setting screen. The operator may press the bottom portion of the directional button 42*b* once and further press the left portion of the directional button 42*b* once to display the turning angle reference setting screen. Thereafter, the operator can press the bottom portion of the directional button 42*b* twice to select the second setting item of the turning angle reference setting screen and thereafter press the right or left portion of the directional button 42*b* to increase or decrease the setting value of the second setting item.

Thus, the display switch button 42*a* of the input device 42 is assigned a function to switch a screen displayed on the display device 40 to the information display and setting screen 41VC. Furthermore, the directional button 42*b* of the input device 42 is assigned a function to switch a screen displayed on the display device 40 to the ICT setting screen. Therefore, the operator can display the ICT setting screen by operating the display switch button 42*a* and the directional button 42*b*.

Furthermore, the directional button 42*b* of the input device 42 is assigned a function to select one of setting items displayed on the ICT setting screen and a function to change the values of the setting items. Therefore, the operator can change the values of the setting items by operating the directional button 42*b*.

Figure 6:
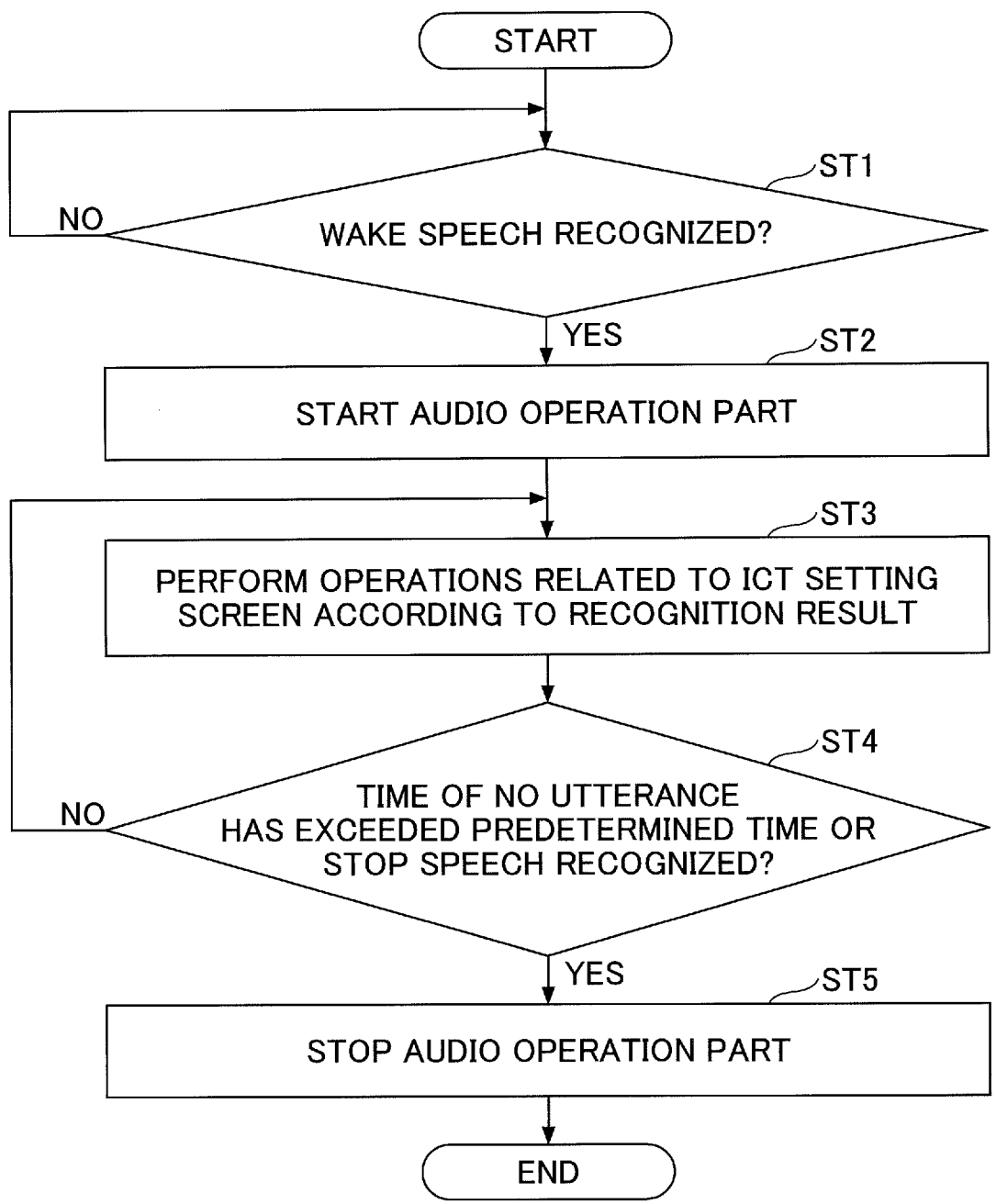
FIG. 6 is a flowchart of a setting change process.
Figure 7:
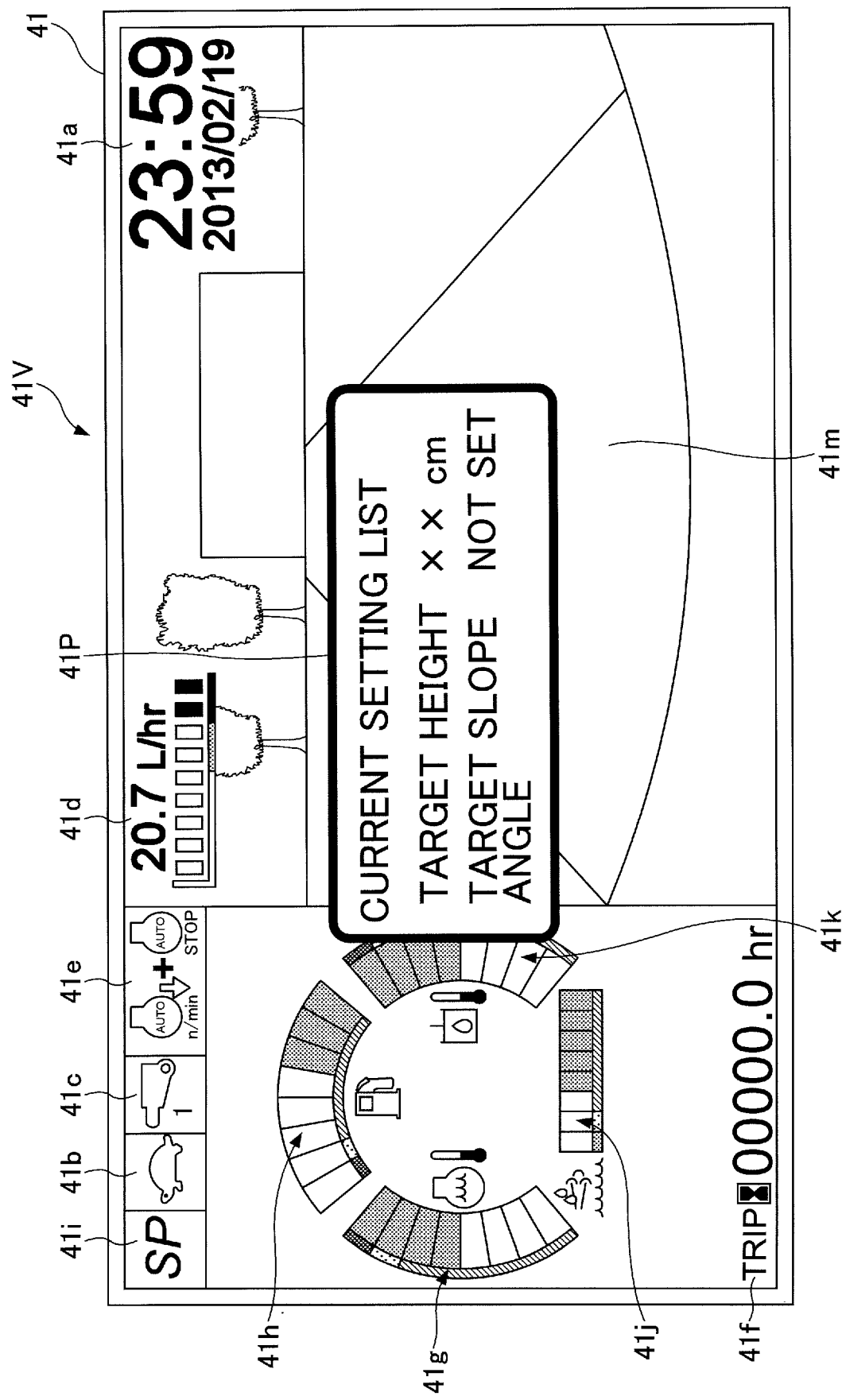
FIG. 7 is a diagram illustrating an example of an image displayed on a display device.
Figure 8:
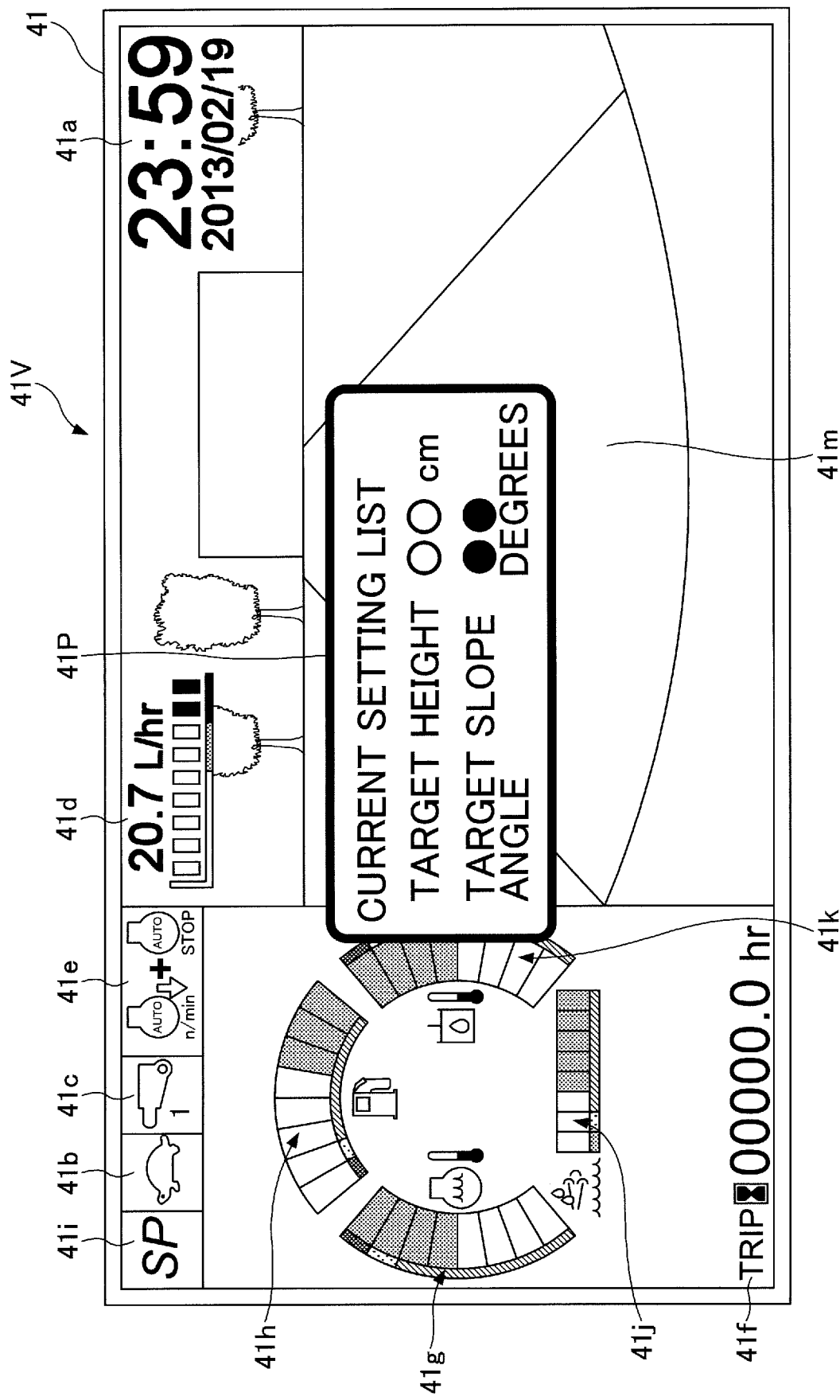
FIG. 8 is a diagram illustrating another example of the image displayed on the display device.

Next, a process of changing setting items on the ICT setting screen using the audio input device 44 provided in the cab 10 (hereinafter, "setting change process") is described with reference to FIGS. 6 through 8. FIG. 6 is a flowchart of the setting change process. The machine guidance device 50 repeatedly executes this setting change process at predetermined control intervals while the shovel PS is in operation. FIGS. 7 and 8 illustrate examples of images displayed on the display device 40.

First, the machine guidance device 50 determines whether the audio recognition part 505 has recognized wake speech (step ST1). For example, the machine guidance device 50 determines whether the audio recognition part 505 has recognized speech "SUMITOMO START."

In response to determining that the audio recognition part 505 has recognized no wake speech (NO at step ST1), the machine guidance device 50 repeats the determination of step ST1 without starting the audio operation part 506.

In response to determining that the audio recognition part 505 has recognized wake speech (YES at step ST1), the machine guidance device 50 starts the audio operation part 506 (step ST2).

The audio operation part 506 is started to execute a process related to the ICT setting screen in accordance with the recognition result of the audio recognition part 505 (step ST3).

For example, in response to determining that the audio recognition part 505 has recognized wake speech, the machine guidance device 50 starts the audio operation part 506 and thereafter displays a list of setting items assigned to screens constituting the ICT setting screen, in order to assist the operator in setting the setting items. Looking at the list, the operator can know what setting items there are or can remember what setting items there have been. The list may be a list of the name of all setting items, a list of the names of some setting items, a list of combinations of the names and current setting values of all setting items, or a list of combinations of the names and current setting values of some setting items.

The machine guidance device 50 may display information related to recommended values for setting items or output audio information related to recommended values for setting items. For example, the machine guidance device 50 may display or speak a message "Do you use the settings from three days ago?" or may display or speak a message "Do you use the settings used at the site of ○○ city, ○○ prefecture?" In this case, the machine guidance device 50 may determine whether to display a list including recommended setting values or whether to adopt recommended setting values according to the operator's operation input through the input device 42 or the operator's audio input through the audio input device 44. The machine guidance device 50 may be configured to learn what setting values are used for recommended values based on various kinds of information including information on the past work of the shovel PS. The machine guidance device 50 may derive information on recommended values for setting items based on the current position of the shovel PS, a date, a current time, etc., and the learning result.

FIG. 7 illustrates a list 41P displayed as a pop-up on the main screen 41V. The list 41P of FIG. 7 shows combinations of the names and current setting values of some setting items, namely, a combination of a setting item "TARGET HEIGHT" and its setting value "xx cm" and a combination of a setting item "TARGET SLOPE ANGLE" and its setting value "NOT SET." "NOT SET" indicates that the setting value of "TARGET SLOPE ANGLE" is not set.

The machine guidance device 50 may display the setting item list when the audio recognition part 505 recognizes predetermined speech such as "Please display list," or "What should I set?"

When the operator does not understand or remember what a setting item "ΔΔ" in the list is, the operator can request the machine guidance device 50 to explain what the setting item is by asking a question such as "What is ΔΔ?" When the audio recognition part 505 recognizes such a question, the machine guidance device 50 may display a screen that explains what the setting item is or may output a voice message related to what the setting item is from the audio output device 43.

For example, when the audio recognition part 505 recognizes speech "Target height ○○ cm," the audio operation part 506 changes the setting value of a setting item "TARGET HEIGHT" in the list 41P to "○○ cm." At this point, the audio operation part 506 may display the setting value of the target height such that the setting value is distinguishable from other images. For example, the audio operation part 506 may blink or display in reverse video the setting value of the target height, in order to indicate that the setting value is not determined or to encourage the operator to do a check. The audio operation part 506 may output a voice message "The target height is ○○ cm. Is this correct?" from the audio output device 43.

When the blinking setting value is not a desired value, the operator speaks a disapproving word and thereafter says a desired value again, like "No. It is xx cm." The utterance of a disapproving word such as "no" may be omitted. When the audio recognition part 505 recognizes another value, the audio operation part 506 changes the target height to the other value and keeps it blinking.

When the blinking setting value is a desired value, the operator speaks an approving word such as "yes," "right," or "OK." The operator may say the desired value after the approving word. When the audio recognition part 505 recognizes the approving word, the audio operation part 506 determines ○○ cm as the target height and stops its blinking. This completes the setting of the target height. The same applies to "TARGET SLOPE ANGLE."

FIG. 8 illustrates the list 41P when "○○ cm" is determined as the setting value of "TARGET HEIGHT" and "•• degrees" is determined as the setting value of "TARGET SLOPE ANGLE." The list 41P of FIG. 8 illustrates that the setting value "xx cm" of the setting item "TARGET HEIGHT" is changed to "○○ cm" and that the setting value "NOT SET" of "TARGET SLOPE ANGLE" is changed to "•• degrees."

The audio operation part 506 may urge that the target height be set by outputting a voice message such as "What about the target height?" before the operator speaks. Furthermore, when the setting of the target height is completed, the audio operation part 506 may urge the setting of other related setting items in a manner such as "What about the target slope angle?" Alternatively, as described above, the audio operation part 506 may propose appropriate setting values by outputting a voice message such as "Do you want to use the settings from three days ago?"

After the start of the audio operation part 506, the machine guidance device 50 determines whether the time of no utterance of the operator has exceeded a predetermined time (step ST4).

In response to determining that the time of no utterance of the operator has not exceeded a predetermined time (NO at step ST4), the machine guidance device 50 causes the audio operation part 506 to continue functioning without stopping the audio operation part 506.

In response to determining that the time of no utterance of the operator has exceeded a predetermined time (YES at step ST4), the machine guidance device 50 stops the audio operation part 506 (step ST5).

When a predetermined condition is satisfied, the audio operation part 506 may urge that the audio operation part 506 be stopped by outputting a voice message such as "What else can I do for you?" In this case, the machine guidance device 50 stops the audio operation part 506 in response to receiving a word or words such as "no" or "nothing in particular" from the operator. The predetermined condition includes at least one of, for example, the completion of the setting of all setting items, the time of no utterance of the operator exceeding a predetermined time, etc. The audio operation part 506 may be forced to stop when the audio recognition part 505 recognizes stop speech such as "SUMITOMO STOP." This is for immediately stopping the audio operation part 506 that is not used, that is, for preventing the audio operation part 506 from mistakenly setting the setting value of a setting item in response to words accidentally spoken by the operator.

Figure 9:
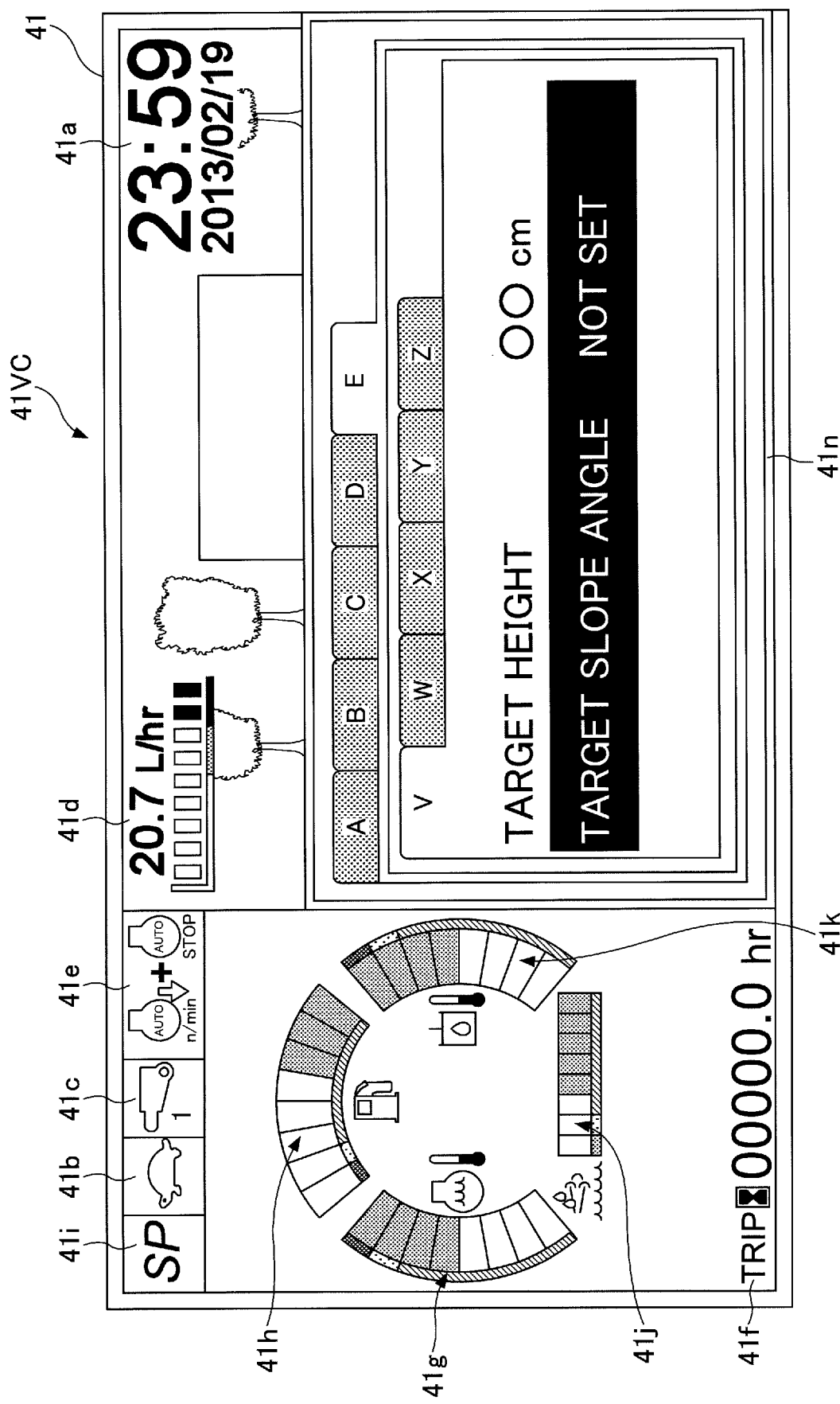
FIG. 9 is a diagram illustrating yet another example of the image displayed on the display device.
Figure 10:
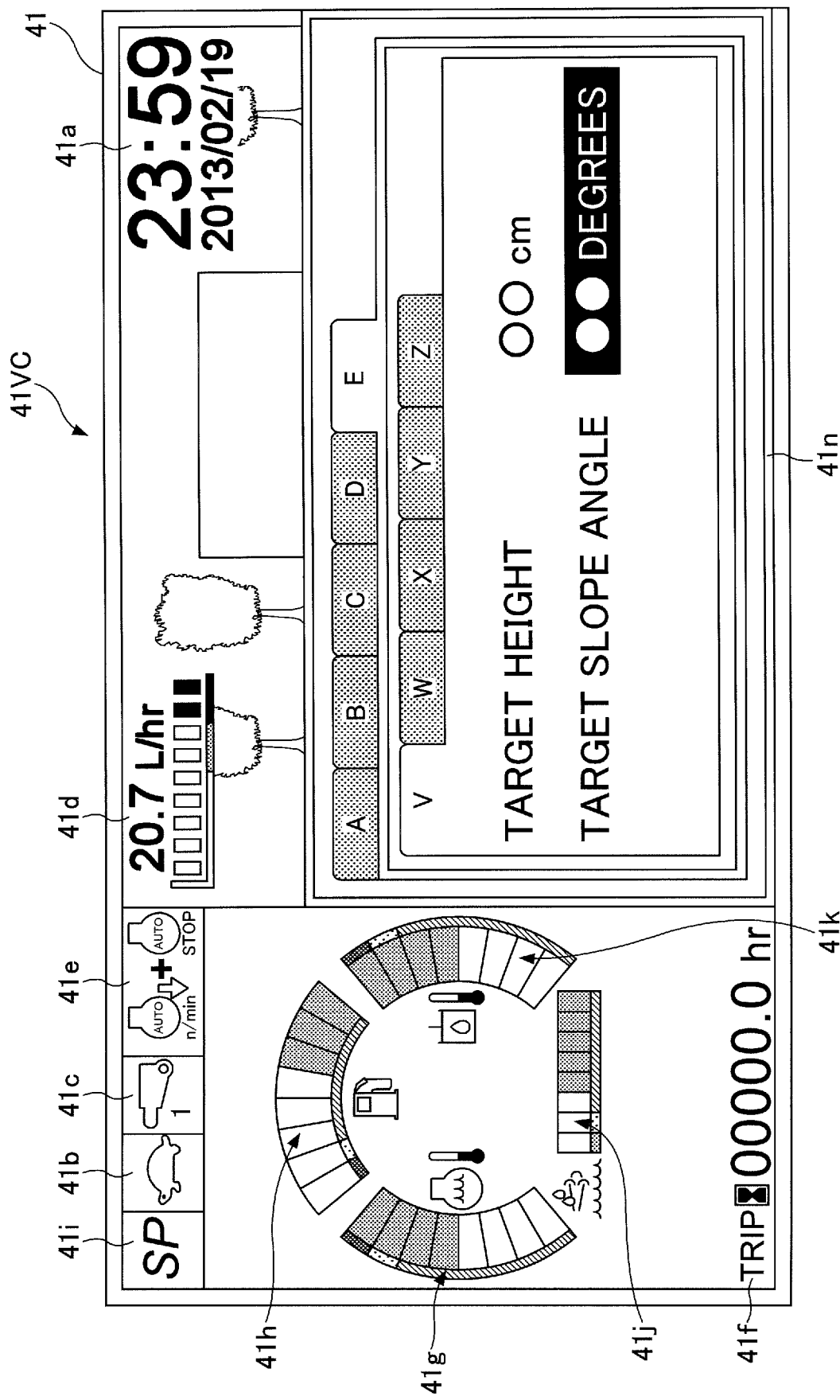
FIG. 10 is a diagram illustrating still another example of the image displayed on the display device.
Figure 11:
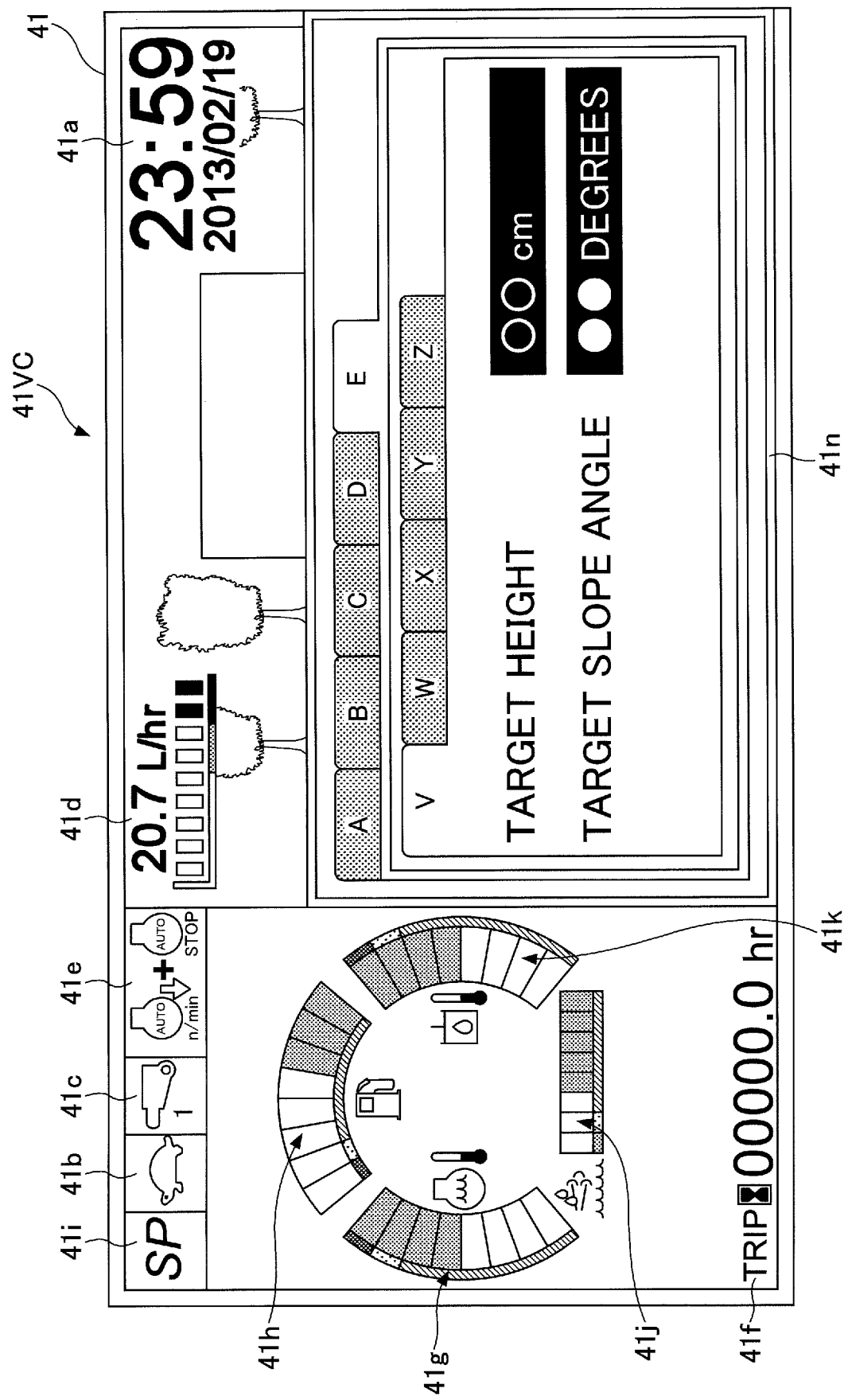
FIG. 11 is a diagram illustrating still another example of the image displayed on the display device.

Next, another example of the setting change process is described with reference to FIGS. 9 through 11. FIGS. 9 through 11 illustrate other examples of images displayed on the display device 40.

For example, when the audio recognition part 505 recognizes speech "Target height ○○ cm," the audio operation part 506 displays the target surface setting screen, which is one of ICT setting screens, and changes the setting value of the target height, which is one of setting items, to ○○ cm. FIG. 9 illustrates the state of the image display part 41 when the setting value of the target height in the target surface setting screen is changed to "○○ cm." At this point, the audio operation part 506 may display the setting value of the target height such that the setting value is distinguishable from other images. For example, the audio operation part 506 may blink or display in reverse video the setting value of the target height, in order to indicate that the setting value is not determined or to encourage the operator to do a check. The audio operation part 506 may output a voice message "The target height is ○○ cm. Is this correct?" from the audio output device 43.

When the displayed setting value is not a desired value, the operator speaks a disapproving word such as "no" and thereafter says a desired value again, like "No. It is xx cm." The utterance of a disapproving word may be omitted. When the audio recognition part 505 recognizes another value, the audio operation part 506 changes the target height to the other value and keeps displaying it in reverse video.

When the setting value displayed in reverse video is a desired value, the operator speaks an approving word such as "yes," "right," or "OK." The operator may say the desired value after the approving word. When the audio recognition part 505 recognizes the approving word, the audio operation part 506 determines ○○ cm as the target height and stops its reverse video display. This completes the setting of the target height.

Thereafter, the audio operation part 506 may urge the setting of other setting items in the target surface setting screen, in a manner such as "What about the target slope angle?" In this case, the audio operation part 506 may display the target slope angle and its setting value such that the target slope angle and its setting value are distinguishable from other images. By way of example, FIG. 9 illustrates the target slope angle and its setting value displayed in reverse video.

In this case, the operator may set the target slope angle by saying, "Target slope angle •• degrees." The operator may abbreviate "Target slope angle •• degrees" to say only "•• degrees." FIG. 10 illustrates the state of the image display part 41 before the setting value of "TARGET SLOPE ANGLE" is determined after being changed to "•• DEGREES." Specifically, FIG. 10 illustrates the state where "•• DEGREES" is displayed in reverse video.

Alternatively, the audio operation part 506 may urge the setting of the target slope angle that is the next setting item by making a proposal such as "Do you use yesterday's setting value for the target slope angle?" after the completion of the setting of the target height. In the case of accepting this proposal, the operator has only to speak an approving word such as "yes."

The operator may set multiple setting items belonging to the same setting screen with single utterance. For example, the operator may set the target height and the target slope angle together by saying, "Target height ○○ cm, target slope angle •• degrees." In this case, the audio operation part 506 displays the target surface setting screen, changes the setting value of the target height to ○○ cm, and changes the setting value of the target slope angle to •• degrees. At this point, the audio operation part 506 may display the respective setting values of the target height and the target slope angle in the target surface setting screen in reverse video. The audio operation part 506 may output a voice message such as "Target height ○○ cm, target slope angle •• degrees. Are these correct?" from the audio output device 43, in order to encourage the operator to do a check.

FIG. 11 illustrates the state of the image display part 41 when the setting value of "TARGET HEIGHT" is changed to "○○ cm" and the setting value of "TARGET SLOPE ANGLE" is changed to "•• DEGREES" in the target surface setting screen. Furthermore, FIG. 11 illustrates the state of the image display part 41 when the respective undetermined setting values of the target height and the target slope angle are displayed in reverse video.

Furthermore, the operator may set multiple setting items belonging to multiple setting screens with single utterance. In this case, the audio operation part 506 displays a setting screen and encourages the operator to do a check by blinking the displayed changed setting value of a setting item in the setting screen. The check (confirmation) by the operator is carried out by, for example, the utterance of an approving word. After the setting value of the setting item is confirmed, the audio operation part 506 displays another setting screen and encourages the operator to do a check by blinking the displayed changed setting value of another setting item in the other setting screen. The same applies to yet another setting item in yet another setting screen.

The operator may set at least one of a reference point associated with the bucket benchmark setting function, a reference associated with the turning benchmark setting function, etc., by giving a voice command to the machine guidance device 50. For example, by saying, "Bucket benchmark setting," with a tooth tip of the bucket 6 being in contact with a reference point, the operator may register the coordinates of the tooth tip of the bucket 6 at the time as the origin. Furthermore, for example, by saying, "Turning benchmark setting," with the upper turning body 3 being turned to be oriented in a desired direction, the operator may register a turning angle at the time as zero degrees.

The operator may switch tabs in the ICT setting screen by giving a voice command to the machine guidance device 50. Examples of voice commands used in switching tabs include "the rightmost tab," "the third tab from the left," etc. When an icon is added to a tab, the operator may speak the characteristics of the icon. For example, when an icon of the bucket 6 is added to a tab, the operator may say, "The tab of the bucket." When a name (including a number, an alphabetical letter, etc.) is added to a tab, the operator may speak the name of the tab. When tabs have different colors, the operator may speak the color of a tab.

The operator may use past setting values by giving a voice command to the machine guidance device 50. Examples of voice commands for using past setting values include voice commands specifying setting values by a date, location, or the like, such as "Use the setting values of ○○ (month, day)," and "Use the setting values at the site of ○○ city, ○○ prefecture." In this case, the audio operation part 506 changes multiple setting values together.

The operator may provide the machine guidance device 50 with a voice command for displaying multiple screens constituting the ICT setting screen such that the screens are switched in predetermined order at predetermined time intervals. For example, when the audio recognition part 505 recognizes a voice command such as "Let me see setting screens in order at intervals of five seconds," the machine guidance device 50 displays multiple screens constituting the ICT setting screen, switching the screens in order at intervals of five seconds. This function enables the operator to easily check the setting values of multiple setting items assigned to multiple screens.

In the setting change process described with reference to FIGS. 9 and 10, unlike in the setting change process described with reference to FIGS. 7 and 8, the same screen as the information display and setting screen (see FIG. 5) displayed in changing the setting values of various setting items using the display switch button 42a and the directional button 42b is displayed. Therefore, after being accustomed to voice operations for changing the setting values of various setting items, the operator can easily change the setting values of various setting items even in the case of using the display switch button 42a and the directional button 42b, because the operator can understand the hierarchical structure of information. For the same reason, after being accustomed to operations for changing the setting values of various setting items using the display switch button 42a and the directional button 42b, the operator can easily change the setting values of various setting items even in the case of using voice operations.

As described above, the shovel PS according to the embodiment of the present invention includes the lower traveling body 1, the upper turning body 3 turnably mounted on the lower traveling body 1, the cab 10 mounted on the upper turning body 3, the display device 40 provided in the cab 10, the audio input device 44 provided in the cab 10, and the machine guidance device 50 serving as a control device including the audio recognition part 50S that implements the voice recognition function. The display device 40 displays the ICT setting screen that is a setting screen associated with work assistance using information and communications technology. The machine guidance device 50 recognizes speech input through the audio input device 44, and executes a process related to the ICT setting screen according to the recognition result. With this configuration, the shovel PS makes it possible for the operator to more easily operate the ICT setting screen. Specifically, the operator can execute a process related to the ICT setting screen without using the display switch button 42a and the directional button 42b. Therefore, the operator can also execute a process related to the ICT setting screen without releasing her/his hand from an operating lever. As a result, the operability of the shovel PS is improved. Furthermore, even without the understanding of the hierarchical structure of information, the operator can directly change the setting value of a desired setting item through voice operations.

As an example of the process related to the ICT setting screen according to the audio recognition result, the machine guidance device 50 may input the value of a setting item in the ICT setting screen according to the audio recognition result. For example, the machine guidance device 50 may input the values of setting items such as a dumper ID and a material ID in a payload-related ICT setting screen based on the audio recognition result. Furthermore, as another example of the process related to the ICT setting screen according to the audio recognition result, the machine guidance device 50 may input the values of multiple setting items in the ICT setting screen together according to the audio recognition result.

When the machine guidance device 50 is configured to recognize the type of a dump truck based on an image captured by the image capturing device 80 through image recognition, and the operator of the shovel PS determines that the type is erroneously recognized, the operator may correct the erroneously recognized type using the audio recognition function. For example, in response to determining that the machine guidance device 50 erroneously recognizes a dump truck having a maximum load capacity of 4 tons as a dump truck having a maximum load capacity of 10 tons, the operator may correct the erroneous recognition by saying, "Four tons."

The machine guidance device 50 may operate interactively. For example, the machine guidance device 50 may output an appropriate voice message at an appropriate time according to the audio recognition result to communicate with the operator smoothly and encourage the operator to input appropriate setting values without omission.

The shovel PS desirably includes the input device 42 for manually inputting the values of setting items on the ICT setting screen. Furthermore, the shovel PS desirably includes the audio output device 43 that outputs audio related to the audio recognition result. The audio related to the audio recognition result includes audio for causing the operator to determine whether the audio recognition result is correct. For example, when recognized speech is "○○ cm," the audio related to the audio recognition result includes "○○ cm" and "Is ○○ cm correct?" At least one of the audio output device 43 and the input device 42 may be omitted. To cause the operator to determine whether the audio recognition result is correct, the shovel PS may display information on the audio recognition result on the display device 40.

The machine guidance device 50 may also be configured to recognize speech input through not the audio input device 44 provided in the cab 10 but the audio input device 44D of the assist device SD and to execute a process related to the ICT setting screen according to the audio recognition result.

A preferred embodiment of the present invention is described above. The present invention, however, is not limited to the above-described embodiment. Various variations, replacements, etc., may be applied to the above-described embodiment without departing from the scope of the present invention. Furthermore, the features described with reference to the above-described embodiment may be suitably combined as long as causing no technical contradiction.

For example, according to the above-described embodiment, the machine guidance device 50 is configured to display a camera image in the camera image display area 41m when the shovel PS is operated. When the shovel PS is not operated, the machine guidance device 50 displays information in the hierarchical information display area 41n in place of a camera image in the camera image display area 41m according to a predetermined input. The machine guidance device 50, however, may display information in the hierarchical information display area 41n simultaneously with a camera image in the camera image display area 41m.

Furthermore, the machine guidance device 50, which operates as a 2D machine guidance device according to the above-described embodiment, may also operate as a 2D machine control device, a 3D machine guidance device, or a 3D machine control device.

Figure 12:
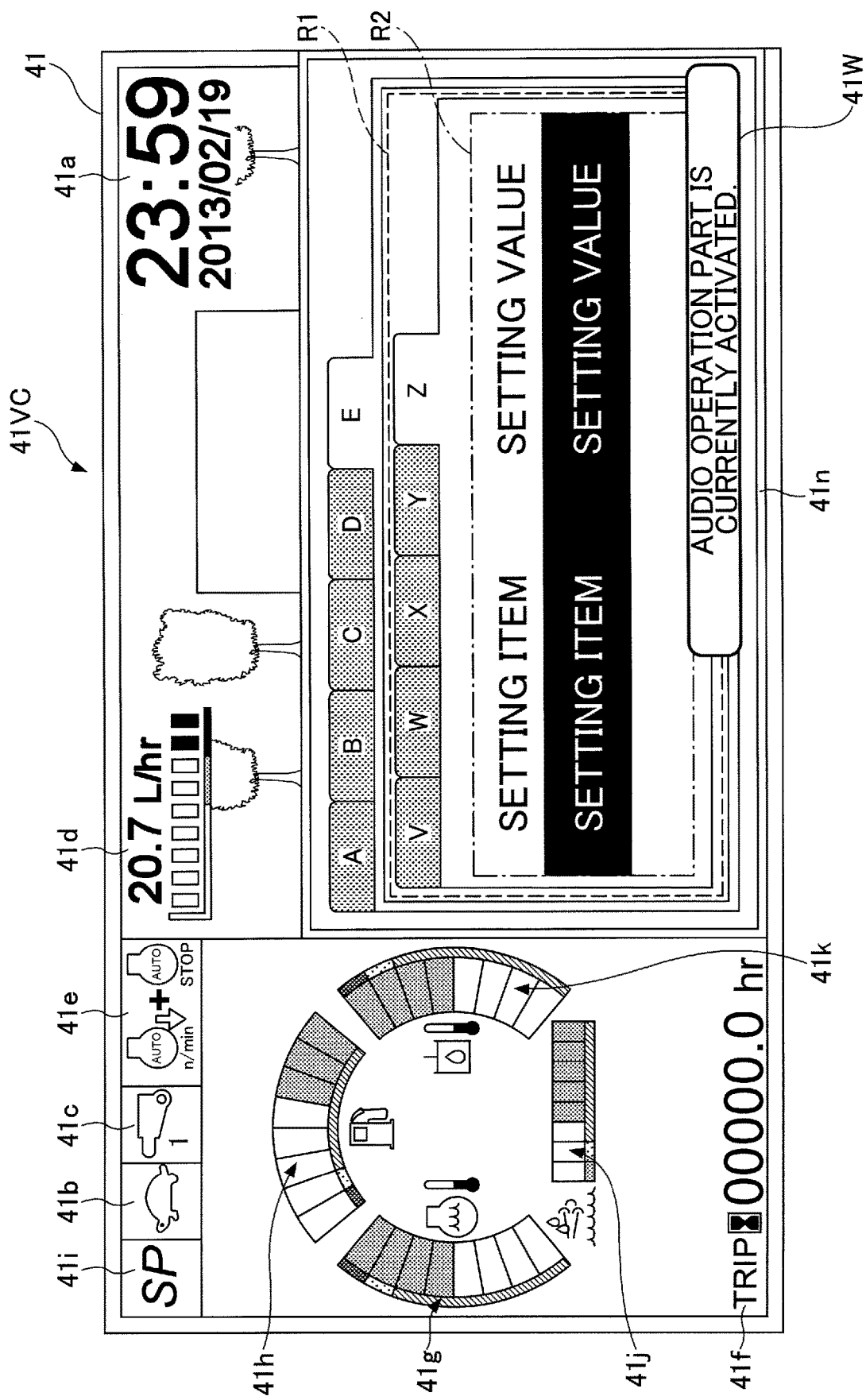
FIG. 12 is a diagram illustrating still another example of the image displayed on the display device.

As illustrated in FIG. 12, the machine guidance device 50 may display a status display window 41W on the image display part 41. The status display window 41W displays the operating status of the shovel PS or the machine guidance device 50. According to FIG. 12, a text message "AUDIO OPERATION PART IS CURRENTLY ACTIVATED" is displayed as status display. The operator can easily understand whether the audio operation part 50S is activated by looking at the status display window 41W.

Figure 13A:
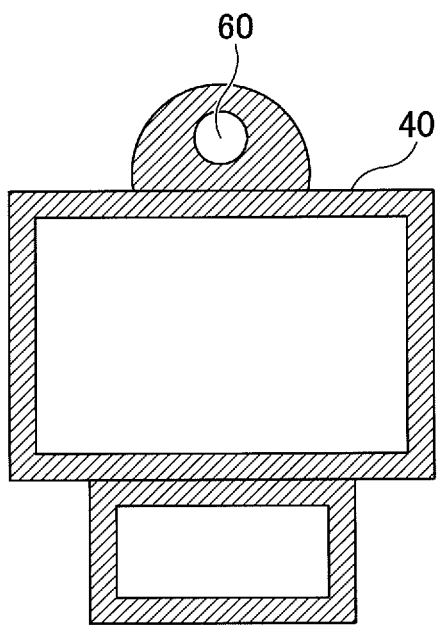
FIGS. 13A and 13B are diagrams illustrating another example configuration of the display device.
Figure 13B:
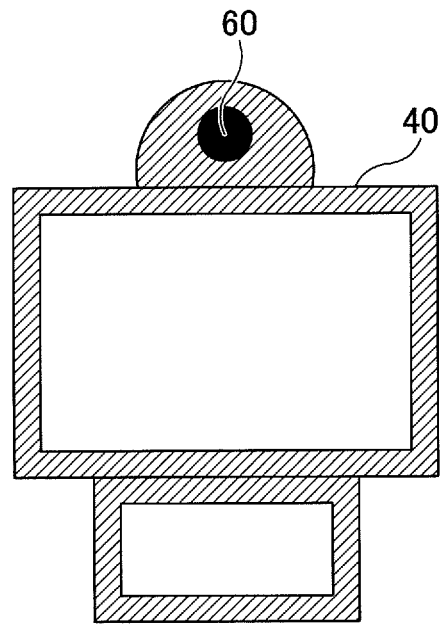

As illustrated in FIGS. 13A and 13B, the machine guidance device 50 may control an indicator 60 provided on top of the display device 40. The indicator 60 is formed of, for example, an LED, and the LED is turned on or off to notify the operator or the like whether the audio recognition function is operating. FIG. 13A illustrates that the indicator 60 is off when the audio recognition function is not operating. FIG. 13B illustrates that the indicator 60 is on when the audio recognition function is operating.

Figure 14:
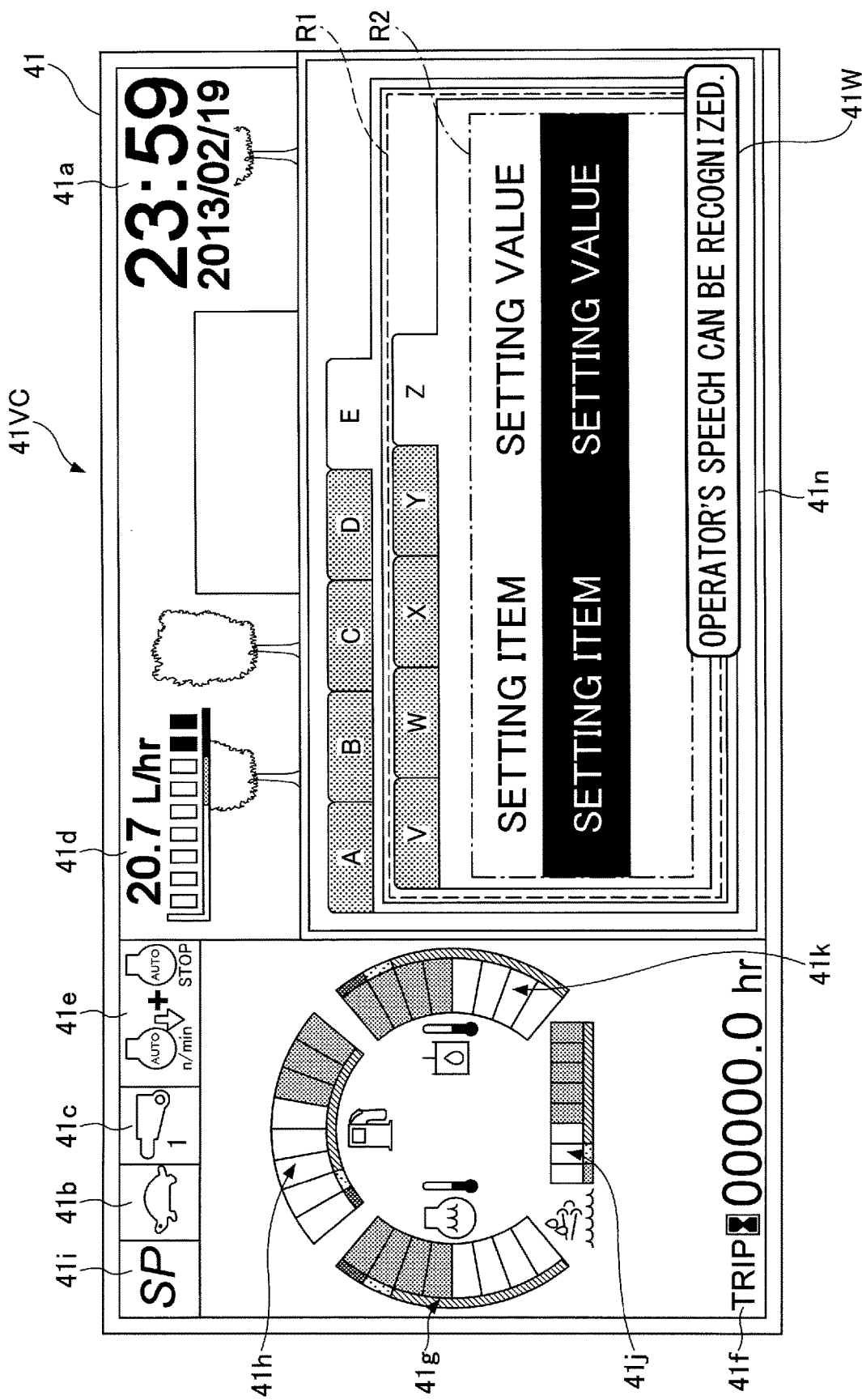
FIG. 14 is a diagram illustrating still another example of the image displayed on the display device.

As illustrated in FIG. 14, the machine guidance device 50 may indicate whether the audio recognition function is operating in the status display window 41W. According to FIG. 14, a text message "OPERATOR'S SPEECH CAN BE RECOGNIZED" is displayed to notify the operator that the audio recognition function is operating. In the case of failing to recognize a word or words spoken by the operator, the machine guidance device 50 may indicate so in the status display window 41W. In addition to a text message, the machine guidance device 50 may display an icon, animation, or the like.

Figure 15:
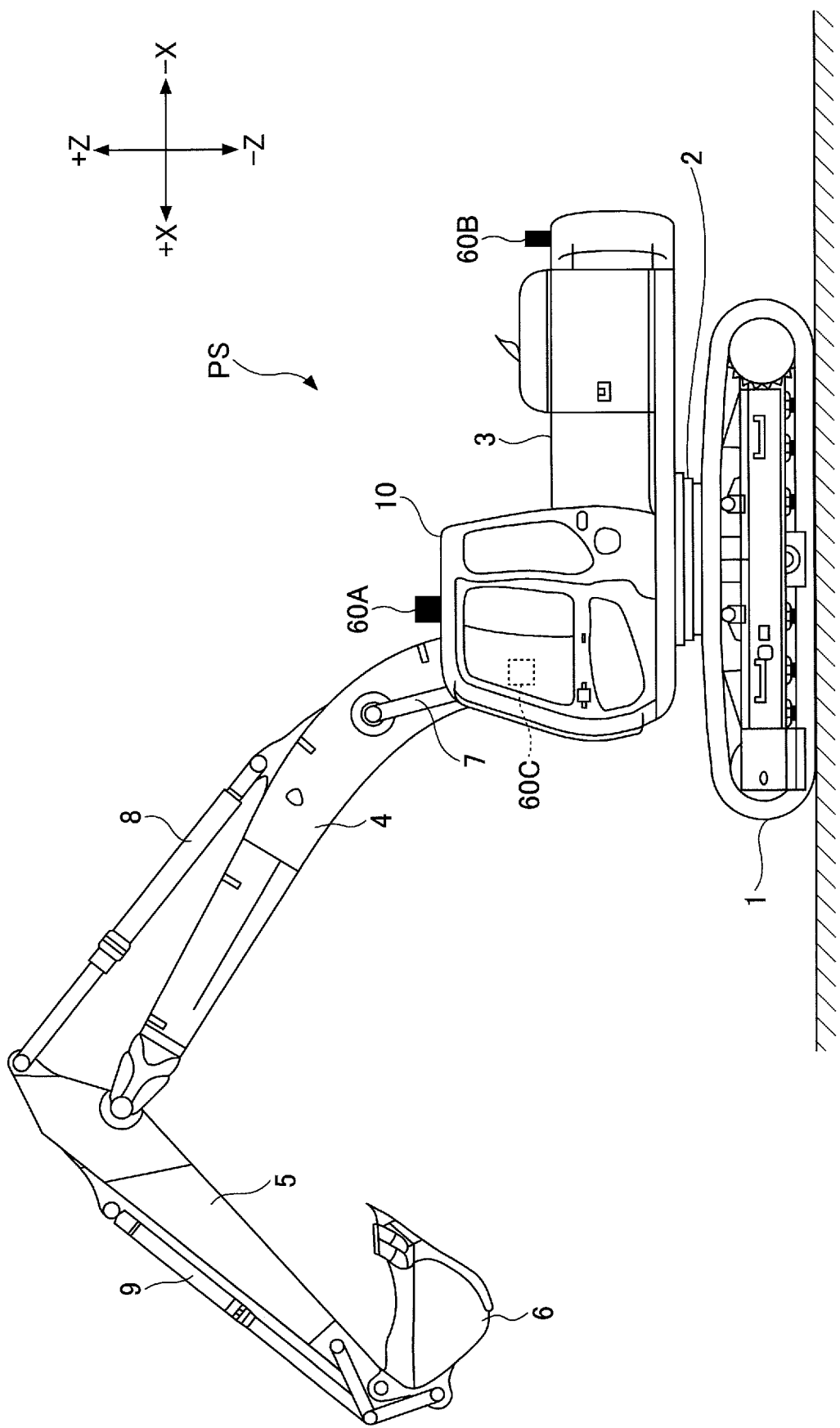
FIG. 15 is a side view of the shovel according to the embodiment of the present invention.

The shovel PS may have the indicator 60 so positioned as to be visible from a supervisor or the like around the shovel PS. For example, as illustrated in FIG. 15, the shovel PS includes at least one of an indicator 60A attached to the roof of the cab 10, an indicator 60B attached to a counterweight, an indicator 60C attached inside the cab 10, etc. A supervisor or the like around the shovel PS can be informed whether a word spoken by herself/himself can be recognized by looking at one or more of the indicators 60A through 60C.

Figure 16:
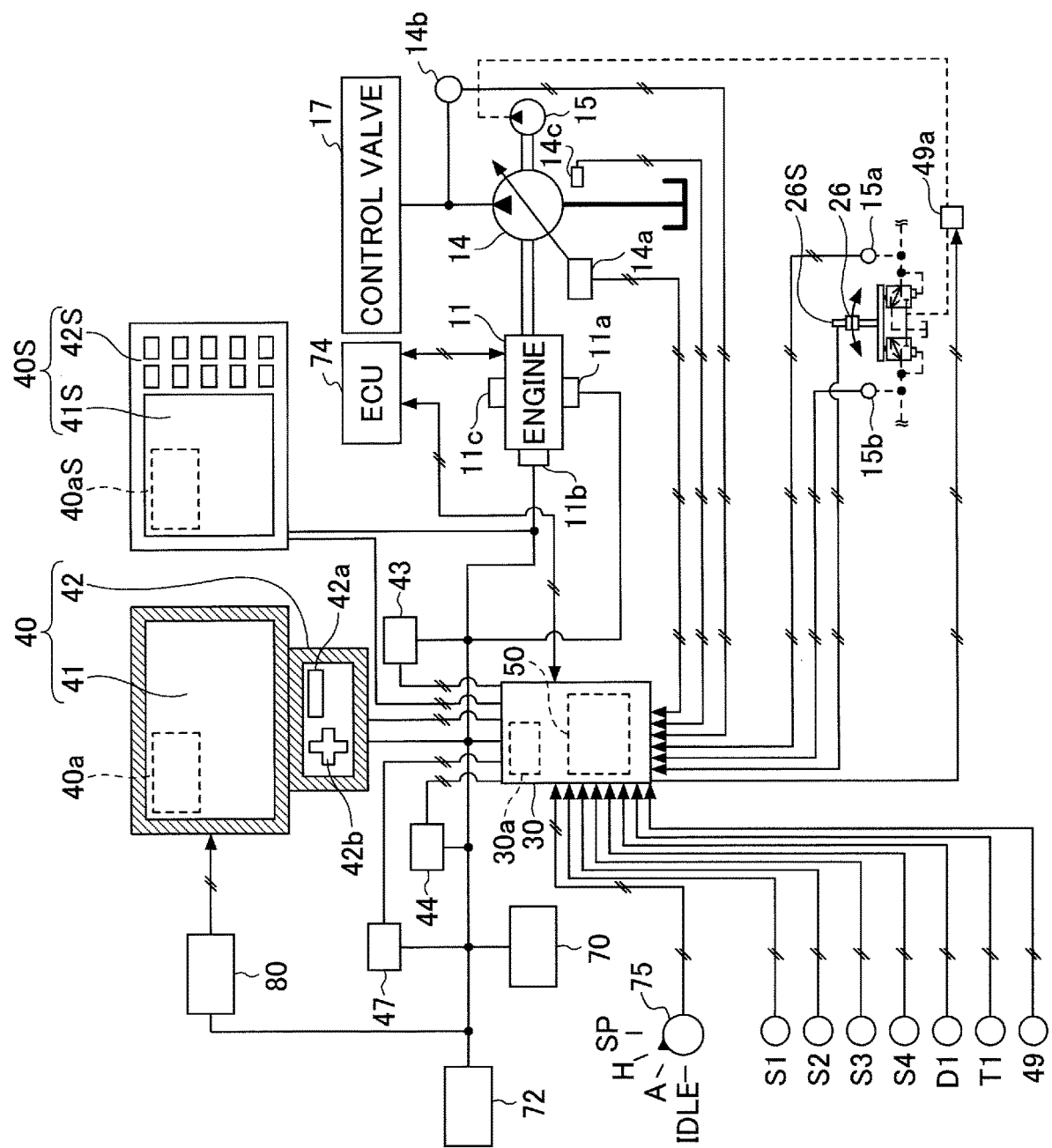
FIG. 16 is a system configuration diagram of the shovel including two display devices.
Figure 17:
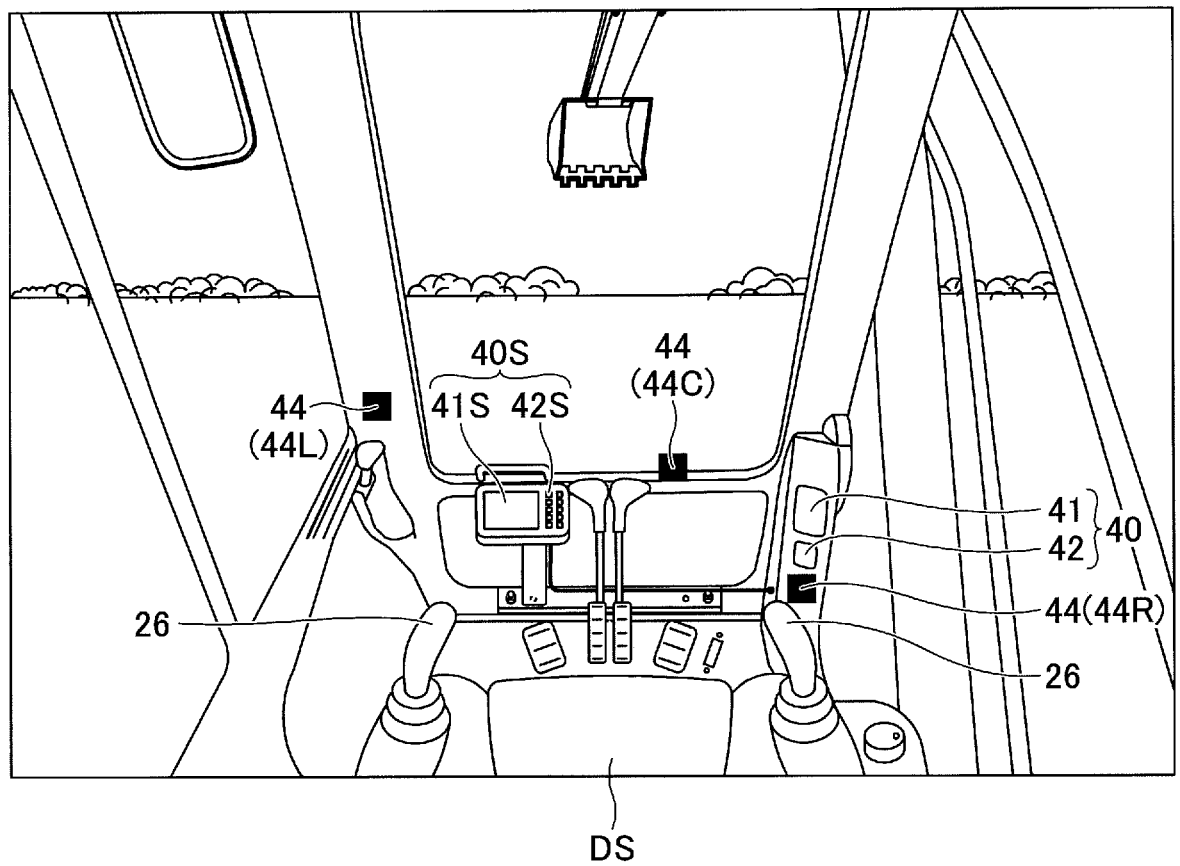
FIG. 17 is a forward looking view from inside the cab of the shovel of FIG. 16.

The shovel PS may include another display device 40S independent of the display device 40. FIG. 16 is a system configuration diagram of the shovel PS including the display device 40 and the display device 40S. The configuration of FIG. 16 is different from the configuration of FIG. 2A in including the display device 40S. FIG. 17 is a forward looking view from inside the cab 10 of the shovel PS of FIG. 16.

The display device 40S displays an image including various kinds of work information in response to a command from the controller 30 or the machine guidance device 50 included in the controller 30. The display device 40S is, for example, a liquid crystal display connected to the machine guidance device 50. The display device 40S includes a conversion part 40aS that generates an image to be displayed on an image display part 41S. The conversion part 40aS converts, into an image signal, data to be displayed on the image display part 41S among various kinds of data input to the display device 40S from the controller 30. The conversion part 40aS outputs the image signal after conversion to the image display part 41S to display an image generated based on a live image and various kinds of data on the image display part 41S.

The display device 40S include an input device 42S. The input device 42S is a device for the operator of the shovel PS to input various kinds of information to the controller 30 including the machine guidance device 50. According to the example of FIG. 16, the input device 42S is push-button switches provided on a switch panel. The input device 42S may be, for example, membrane switches or a touchscreen.

According to this embodiment, as illustrated in FIG. 17, the display device 40S is attached to an attachment stay vertically extending upward from the floor of the cab 10.

According to the configuration illustrated in FIGS. 16 and 17, the display device 40 may be, for example, a monitor that displays the main screen, the information display and setting screen, or the like. The display device 40S may be, for example, a monitor dedicated to a function using ICT, such as the machine guidance function or the machine control function. However, the display device 40 may display information associated with a function using ICT, such as the machine guidance function or the machine control function, and the display device 40S may display the main screen, the information display and setting screen, or the like. Furthermore, while being attached in front and to the left of an operator seat DS according to FIG. 17, the display device 40S may alternatively be attached in front and to the right of the operator seat DS.

Furthermore, according to the configuration illustrated in FIGS. 16 and 17, the display device 40S may include an audio input device, an audio output device, and an indicator to implement the functions implemented in the above-described embodiment. Furthermore, the display device 40S may include an audio input device, an audio output device, an indicator, and a machine guidance device to implement the functions implemented in the above-described embodiment. Specifically, the display device 40S may display the list 41P that shows a list of setting items assigned to multiple screens that constitute the ICT setting screen and the status display window 41W that displays the operating status of the audio recognition function.

The audio input device 44 provided in the cab 10 may be two or more in number. As illustrated in FIG. 17, the audio input device 44 may include a central audio input device 44C, a left audio input device 44L, and a right audio input device 44R. According to the example of FIG. 17, the central audio input device 44C is installed in front of the operator seat DS, the left audio input device 44L is installed in front and to the left of the operator seat DS, and the right audio input device 44R is installed in front and to the right of the operator seat DS. This configuration ensures that the machine guidance device 50 can recognize speech spoken by the operator seated in the operator seat DS even in noisy places such as a construction site. This is because working together with multiple audio input devices makes it possible to extract the operator's speech, spatially distinguishing the operator's speech from noise, using a noise-resistant audio recognition technique. As a result, it is possible to prevent false operation of the shovel PS or the like due to erroneous speech recognition.

Furthermore, while including the display device 40S in addition to the display device 40 according to the example of FIG. 17, the shovel PS may include the display device 40 including two or more image display parts without including the display device 40S. In this case, for example, the main screen, the information display and setting screen, or the like may be displayed on one of the image display parts, and information associated with a function using ICT, such as the machine guidance function or the machine control function, may be displayed on another one of the image display parts.

Figure 18:
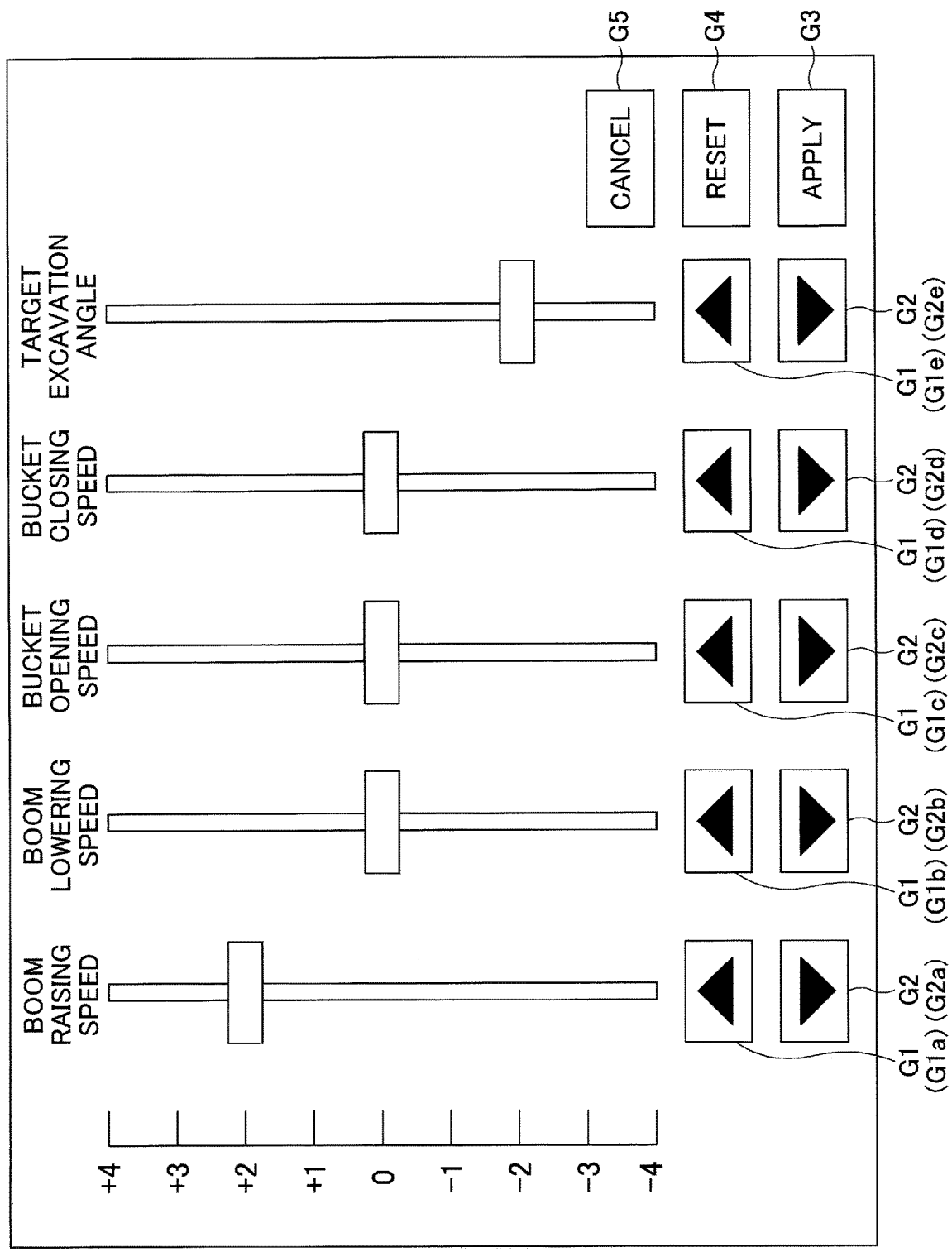
FIG. 18 is a diagram illustrating still another example of the image displayed on the display device.

Next, another example of the ICT setting screen in which setting items associated with the machine control function are shown is described with reference to FIG. 18. FIG. 18 illustrates a machine control setting screen that is another example of the ICT setting screen in which setting items associated with the machine control function are shown. In the machine control setting screen of FIG. 18, a boom raising speed, a boom lowering speed, a bucket opening speed, a bucket closing speed, and a target excavation angle are shown as setting items. According to the illustration of FIG. 18, the machine control function is a function to automatically extend or retract at least one of the boom cylinder 7, the arm cylinder 8, and the bucket cylinder 9 so that the leading edge of the bucket 6 moves along a target surface when the arm 5 is opened or closed. Automatic extension or retraction of the boom cylinder 7 means extending or retracting the boom cylinder 7 independent of the presence or absence of a boom operation and the amount of operation of a boom operating lever. The same applies to the arm cylinder 8 and the bucket cylinder 9. The target surface is, for example, a slope or a horizontal surface.

Each of the boom raising speed, the boom lowering speed, the bucket opening speed, the bucket closing speed, and the target excavation angle is a parameter that is used when the machine control function is executed. According to the illustration of FIG. 18, the boom raising speed is represented by the amount of extension of the boom cylinder 7 per unit angle of the arm angle, and the boom lowering speed is represented by the amount of retraction of the boom cylinder 7 per unit angle of the arm angle. Furthermore, the bucket opening speed is represented by the amount of extension of the bucket cylinder 9 per unit angle of the arm angle, and the bucket closing speed is represented by the amount of retraction of the bucket cylinder 9 per unit angle of the arm angle. The target excavation angle is represented by the angle formed between the back surface of the bucket 6 and the target surface. According to the illustration of FIG. 18, the controller 30 automatically extend or retract at least one of the boom cylinder 7, the arm cylinder 8, and the bucket cylinder 9 so that the target excavation angle is maintained during the execution of the machine control function. For example, the target excavation angle becomes a positive value when the back end portion of the bucket 6 is above the target surface with a teeth tip of the bucket 6 being in contact with the target surface, and becomes a negative value when a teeth tip of the bucket 6 is above the target surface with the back end portion of the bucket 6 being in contact with the target surface.

Typically, the boom raising speed is incremented when an actual excavation surface famed using the machine control function is lower than the target surface and is decremented when the actual excavation surface is higher than the target surface. Typically, the boom lowering speed is decremented when the actual excavation surface is lower than the target surface and is incremented when the actual excavation surface is higher than the target surface. Typically, the bucket opening speed is incremented when an excavation angle that is an actual angle formed between the back surface of the bucket 6 and the target surface during the execution of the machine control function is generally less than the target excavation angle and is decremented when the excavation angle is generally more than the target excavation angle. The target excavation angle is typically increased or decreased on an as-needed basis in view of the unevenness, etc., of the actual excavation surface.

The machine control setting screen of FIG. 18 includes images G1 through G5. The image G1 is a software button (an increase button) that is used in incrementing each setting item, and includes images G1a through G1e. Specifically, the image G1a is an increase button that is used in incrementing the boom raising speed, the image G1b is an increase button that is used in incrementing the boom lowering speed, the image G1c is an increase button that is used in incrementing the bucket opening speed, the image G1d is an increase button that is used in incrementing the bucket closing speed, and the image G1e is an increase button that is used in incrementing the target excavation angle. The image G2 is a software button (a decrease button) that is used in decrementing each setting item, and includes images G1a through G2e. Specifically, the image G2a is a decrease button that is used in decrementing the boom raising speed, the image G2b is a decrease button that is used in decrementing the boom lowering speed, the image G2c is a decrease button that is used in decrementing the bucket opening speed, the image G2d is a decrease button that is used in decrementing the bucket closing speed, and the image G2e is a decrease button that is used in decrementing the target excavation angle. According to the illustration of FIG. 18, each setting item is configured to be adjustable for nine levels. Specifically, each setting item is configured to be adjustable for four positive levels and for four negative levels.

The image G3 is a software button (an APPLY button) for enabling all the results of adjustment made to the setting items using at least one of the increase button and the decrease button.

The image G4 is a software button (a RESET button) for resetting all the results of adjustment made to the setting items using at least one of the increase button and the decrease button.

The image G5 is a software button (a CANCEL button) for canceling all the results of adjustment made to the setting items using at least one of the increase button and the decrease button after the last depression of the APPLY button.

The machine control setting screen may include "BOOM RAISING SPEED DURING TURNING" as a setting item. The boom raising speed during turning is used in a first assistance function that is another one of machine control functions. The first assistance function is a function to automatically extend or retract the boom cylinder 7 to adjust the speed of raising the boom 4 according to the turning speed of the upper turning body 3 when a complex operation including a turning operation and a boom raising operation is performed. The boom raising speed during turning is represented by, for example, the amount of extension of the boom cylinder 7 per unit angle of the turning angle.

The machine control setting screen may include "BOOM LOWERING SPEED DURING TURNING" as a setting item. The boom lowering speed during turning is used in a second assistance function that is another one of machine control functions. The second assistance function is a function to automatically extend or retract the boom cylinder 7 to adjust the speed of lowering the boom 4 according to the turning speed of the upper turning body 3 when a complex operation including a turning operation and a boom lowering operation is performed. The boom lowering speed during turning is represented by, for example, the amount of retraction of the boom cylinder 7 per unit angle of the turning angle.

The machine control setting screen may include "TURNING SPEED DURING BOOM RAISING" as a setting item. The turning speed during boom raising is used in a third assistance function that is yet another one of machine control functions. The third assistance function is a function to automatically rotate the turning hydraulic motor to adjust the turning speed according to the speed of raising the boom 4 when a complex operation including a turning operation and a boom raising operation is performed. The turning speed during boom raising is represented by, for example, the rotation angle of the turning hydraulic motor per unit extension amount of the boom cylinder 7.

The machine control setting screen may include "TURNING SPEED DURING BOOM LOWERING" as a setting item. The turning speed during boom lowering is used in a fourth assistance function that is yet another one of machine control functions. The fourth assistance function is a function to automatically rotate the turning hydraulic motor to adjust the turning speed according to the speed of lowering the boom 4 when a complex operation including a turning operation and a boom lowering operation is performed. The turning speed during boom lowering is represented by, for example, the rotation angle of the turning hydraulic motor per unit retraction amount of the boom cylinder 7.

With this configuration, the operator of the shovel PS can set each setting item on the machine control setting screen using at least one of the input device 42 and the audio input device 44. That is, the operator can set each setting item on the machine control setting screen by not only manually operating the machine guidance device 50 but also giving a voice command to the machine guidance device 50.

What is claimed is:

1. A shovel comprising:
a lower traveling body;
an upper turning body turnably mounted on the lower traveling body;
a cab mounted on the upper turning body;
a display device provided in the cab and configured to display a setting screen associated with work assistance;
an audio input device provided in the cab; and
a hardware processor configured to perform audio recognition,
wherein the hardware processor is configured to recognize speech input through the audio input device and executes a process related to the setting screen according to a result of recognizing the speech, and
the hardware processor is configured to, when the recognized speech expresses a numerical value of a setting item in the setting screen, change a setting value of the setting item to the numerical value expressed by the recognized speech.

2. The shovel as claimed in claim 1, wherein the hardware processor is configured to input a value of a setting item in the setting screen according to the result of recognizing the speech.

3. The shovel as claimed in claim 1, wherein the hardware processor is configured to input values of a plurality of setting items in the setting screen together according to the result of recognizing the speech.

4. The shovel as claimed in claim 1, further comprising:
an input device through which a value of a setting item in the setting screen is manually input.

5. The shovel as claimed in claim 1, further comprising:
au audio output device configured to output audio related to the result of recognizing the speech.

6. The shovel as claimed in claim 1, wherein the display device includes a plurality of display devices.

7. The shovel as claimed in claim 1, wherein the display device is configured to display a status display window.

8. The shovel as claimed in claim 1, further comprising:
an indicator configured to indicate whether the hardware processor is enabled to perform the audio recognition.

9. The shovel as claimed in claim 1, wherein the audio input device includes a plurality of audio input devices.

10. The shovel as claimed in claim 1, wherein the hardware processor is configured to recognize predetermined wake speech input through the audio input device to start an audio operation function to enable execution of a process according to speech that is thereafter input through the audio input device.

11. The shovel as claimed in claim 10, wherein the hardware processor is configured to display the setting screen associated with work assistance on the display device according to the result of recognizing the speech.

12. A shovel comprising:
a lower traveling body;
an upper turning body turnably mounted on the lower traveling body;
a cab mounted on the upper turning body;
a display device provided in the cab and configured to display a setting screen associated with work assistance using information and communications technology; and
a hardware processor configured to execute a process related to the setting screen according to a result of recognizing speech input through an audio input device of a portable terminal,
wherein the hardware processor is configured to, when the recognized speech expresses a numerical value of a setting item in the setting screen, change a setting value of the setting item to the numerical value expressed by the recognized speech.

13. An assist device configured to work together with a shovel, the shovel including a lower traveling body, an upper turning body turnably mounted on the lower traveling body, a cab mounted on the upper turning body, a display device provided in the cab and configured to display a setting screen associated with work assistance, a communications device, and a control device configured to execute a process related to the setting screen according to a result of recognizing speech, the assist device comprising:
an audio input device through which the speech is input; and
a communications device configured to, when the recognized speech input through the audio input device expresses a numerical value of a setting item in the setting screen, transmit a command to change a setting value of the setting item in the setting screen to the numerical value expressed by the recognized speech.

* * * * *